United States Patent
San Andres et al.

(10) Patent No.: US 7,502,832 B2
(45) Date of Patent: Mar. 10, 2009

(54) DISTRIBUTED DIRECTORY SERVICE USING JUNCTION NODES FOR PROVIDING NETWORK USERS WITH AN INTEGRATED HIERARCHICAL DIRECTORY SERVICES

(75) Inventors: Ramon J. San Andres, Berkeley, CA (US); David S. Sanderman, Redmond, WA (US); Sean P. Nolan, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 558 days.

(21) Appl. No.: 10/911,055

(22) Filed: Aug. 4, 2004

(65) Prior Publication Data

US 2005/0027796 A1    Feb. 3, 2005

Related U.S. Application Data

(62) Division of application No. 09/139,090, filed on Aug. 24, 1998, now Pat. No. 6,901,433.

(51) Int. Cl.
G06F 15/167 (2006.01)
(52) U.S. Cl. .............. 709/216; 707/1; 707/200
(58) Field of Classification Search ........... 709/216, 709/201, 203, 217, 218, 219; 707/1, 200, 707/10, 100, 201, 5, 8
See application file for complete search history.

(56) References Cited

U.S. PATENT DOCUMENTS

| | | | |
|---|---|---|---|
| 4,184,200 A | 1/1980 | Wagner et al. |
| 4,280,176 A | 7/1981 | Tan |
| 4,432,057 A | 2/1984 | Daniell et al. |
| 4,493,024 A | 1/1985 | Baxter et al. |
| 4,799,153 A | 1/1989 | Hann et al. |
| 4,799,156 A | 1/1989 | Shavit et al. |
| 4,800,488 A | 1/1989 | Agrawal et al. |
| 4,858,117 A | 8/1989 | Dichiara et al. |
| 4,899,136 A | 2/1990 | Beard et al. |
| 4,914,571 A | 4/1990 | Baratz et al. |
| 5,012,405 A | 4/1991 | Nishikado et al. |
| 5,032,979 A | 7/1991 | Hecht et al. |
| 5,079,765 A | 1/1992 | Nakamura |
| 5,113,499 A | 5/1992 | Ankney et al. |
| 5,140,689 A | 8/1992 | Kobayashi |
| 5,151,989 A | 9/1992 | Johnson et al. |

(Continued)

OTHER PUBLICATIONS

So . . . Just What is this First Class Thing Anyway? (visited Oct. 10, 1995) <http://orion.edmonds.wednet.edu/ESD/FC/AboutFC.html>.

(Continued)

Primary Examiner—Le Luu

(57) ABSTRACT

A distributed directory service for an online services network. The directory service comprises multiple, separate services, referred to as "Directory Service Providers." Each Directory Service Provider stores and provides access to a respective hierarchical directory structure, with nodes of the directory structures representing the various on-line services and other content entities which may be accessed by end users of the network. A common application program interface is implemented by all Directory Service Providers, allowing client applications running on computers of end users to access the different directory structures using a common set of software methods. Various forms of node filtering, including language-based filtering and access rights filtering, are performed by the Directory Service Providers to determine which nodes to show end users.

22 Claims, 12 Drawing Sheets

U.S. PATENT DOCUMENTS

| | | |
|---|---|---|
| 5,159,669 A | 10/1992 | Trigg et al. |
| 5,187,790 A | 2/1993 | Fast et al. |
| 5,247,676 A | 9/1993 | Ozur et al. |
| 5,257,369 A | 10/1993 | Skeen et al. |
| 5,265,250 A | 11/1993 | Andrade et al. |
| 5,291,597 A | 3/1994 | Shorter et al. |
| 5,307,490 A | 4/1994 | Davidson et al. |
| 5,321,841 A | 6/1994 | East |
| 5,329,619 A | 7/1994 | Page et al. |
| 5,339,435 A | 8/1994 | Lubkin et al. |
| 5,341,477 A | 8/1994 | Pitkin et al. |
| 5,347,632 A | 9/1994 | Filepp et al. |
| 5,355,497 A | 10/1994 | Cohen-Levy |
| 5,367,621 A | 11/1994 | Cohen et al. |
| 5,371,852 A | 12/1994 | Attanasio |
| 5,388,255 A | 2/1995 | Pytlik et al. |
| 5,396,626 A | 3/1995 | Nguyen |
| 5,414,826 A | 5/1995 | Garcia |
| 5,423,003 A | 6/1995 | Berteau |
| 5,434,994 A | 7/1995 | Shaheen et al. |
| 5,442,791 A | 8/1995 | Wrabetz et al. |
| 5,444,848 A | 8/1995 | Johnson et al. |
| 5,455,932 A | 10/1995 | Major et al. |
| 5,463,625 A | 10/1995 | Yasrebi |
| 5,473,599 A | 12/1995 | Li et al. |
| 5,475,819 A | 12/1995 | Miller et al. |
| 5,481,720 A | 1/1996 | Loucks et al. |
| 5,483,596 A | 1/1996 | Rosenow et al. |
| 5,483,652 A | 1/1996 | Sudama et al. |
| 5,490,270 A | 2/1996 | Devarakonda et al. |
| 5,491,800 A | 2/1996 | Goldsmith et al. |
| 5,491,817 A | 2/1996 | Gopal et al. |
| 5,491,820 A | 2/1996 | Belove et al. |
| 5,497,463 A | 3/1996 | Stein et al. |
| 5,499,342 A | 3/1996 | Kurihara et al. |
| 5,500,929 A | 3/1996 | Kickinson |
| 5,504,892 A | 4/1996 | Atsatt et al. |
| 5,506,955 A | 4/1996 | Chen et al. |
| 5,513,314 A | 4/1996 | Kadasamy et al. |
| 5,515,508 A | 5/1996 | Pettus et al. |
| 5,526,491 A | 6/1996 | Wei |
| 5,530,852 A | 6/1996 | Meske et al. |
| 5,537,618 A | 7/1996 | Boulton et al. |
| 5,544,313 A | 8/1996 | Shachanai et al. |
| 5,544,327 A | 8/1996 | Dan et al. |
| 5,548,724 A | 8/1996 | Akizawa et al. |
| 5,548,726 A | 8/1996 | Pettus |
| 5,551,508 A | 9/1996 | Lim et al. |
| 5,553,239 A | 9/1996 | Heath et al. |
| 5,553,242 A | 9/1996 | Russell et al. |
| 5,559,969 A | 9/1996 | Jennings |
| 5,564,043 A | 10/1996 | Siefert |
| 5,572,643 A | 11/1996 | Judson |
| 5,581,753 A | 12/1996 | Terry et al. |
| 5,592,611 A | 1/1997 | Midgely et al. |
| 5,596,579 A | 1/1997 | Yasrebi |
| 5,596,744 A | 1/1997 | Dao |
| 5,608,865 A | 3/1997 | Midgely et al. |
| 5,608,903 A | 3/1997 | Prasad et al. |
| 5,617,568 A | 4/1997 | Ault et al. |
| 5,617,570 A | 4/1997 | Russell et al. |
| 5,619,632 A | 4/1997 | Lamping et al. |
| 5,619,657 A | 4/1997 | Sudama et al. |
| 5,650,994 A | 7/1997 | Daley |
| 5,666,519 A | 9/1997 | Hayden |
| 5,675,723 A | 10/1997 | Ekrot et al. |
| 5,675,782 A | 10/1997 | Montague et al. |
| 5,675,796 A | 10/1997 | Hodges et al. |
| 5,678,041 A | 10/1997 | Baker et al. |
| 5,692,180 A | 11/1997 | Lee |
| 5,696,895 A | 12/1997 | Hemphill |
| 5,734,719 A | 3/1998 | Tsevdos et al. |
| 5,774,668 A | 6/1998 | Choquire et al. |
| 5,787,281 A | 7/1998 | Schreiber et al. |
| 5,826,254 A | 10/1998 | Kahn |
| 5,864,683 A | 1/1999 | Boebert et al. |
| 5,933,599 A | 8/1999 | Nolan |
| 5,941,947 A | 8/1999 | Brown et al. |
| 5,956,489 A | 9/1999 | San Andres et al. |
| 5,956,509 A | 9/1999 | Kevner |
| 6,122,754 A | 9/2000 | Litwin et al. |

OTHER PUBLICATIONS

Colton, Malcolm, "Replication Data in a Distributed Enviroment," *IEEE* (1993).

Coulouris et al., "Distributed Transactions," Chapter 14 of *Distributed Systems Concepts and Design* $2^{nd}$ *Ed.*,409-421 (1994).

Cox, John, "Sybase Server to Add Complexity User for Challenge with Data Replication," *Communication* No. 483 (1993).

Custer, Helen, "The Object Manager and Object Security," *Inside Windows NT*, Chapter 3, 40-43, 49-81 (1993).

Eckerson, Wayne, "Users Give Green Light for Replication," *Network World* (Jul. 19, 1993).

Edelstein, Herb, "The Challenge of Replication," *DBMS* vol. 8, No. 4, 68 (Apr. 1995).

Edelstein, Herb, "Microsoft and Sybase are Adding their Unique Touches to SQI Servers," *Information Week*, No. 528, 62 (1995).

Edelstein, Herb, "Replication Data," *DBMS* vol. 6, No. 6, 59 (Jun. 1993).

Goulde, Michael, "RDBMS Server Choice Gets Tougher," *Network World*, 52 (May 23, 1994).

Heylighen, Francis, "World-Wide Web: A Distributed Hypermedia Paradigm for Global Networking," *Proceedings of the Share Europe Spring Conference*, 355-368 (1994).

International Telecommunication Union, *CCITT Blue Book vol. VIII Data Communiation Networks Directory*, 3-18 (1989).

King, Adrian, "The User Interface and the Shell," *Inside Windows 95*, Chapter 5 (1994).

Pallatlo, John, "Sybase Lays Out Blue Print for Client/Server Networks," *PC Week*, vol. 9, No. 461, 6 (1992).

PR Newswire Association, Inc., "America On-line Publicly Previews World Wide Web Browser," *Financial News Section* (May 9, 1995).

Quereshi, "The Effect of Workload on the Performance and Availability of Voting Algorithms," *IEEE* (1995).

Rexford, Jennifer, "Window Consistent Replication for Real-Time Applications," *IEEE* (1994).

Richman, Dan, "Sybase to Enhance RDBMS," *Open System Today*, No. 111 (1992).

Silberschatz, et al., *Operating System Concepts*, $4^{th}$ Ed., 361-380,431-457 (1994).

Terry, Douglas, "Session Guarantees for Weekly Consistent Replicated Data," *IEEE* (1994).

Wang, Yongdong, Data Replication in a Distributed Heterogenous Database Environment, *IEEE* (1994).

DISTRIBUTED DIRECTORY SERVICE USING JUNCTION NODES FOR PROVIDING NETWORK USERS WITH AN INTEGRATED HIERARCHICAL DIRECTORY SERVICES

RELATED APPLICATIONS

This application is a divisional of U.S. application Ser. No. 09/139,090, filed Aug. 24, 1998, entitled "A System For Providing Users With a Filtered View of Interactive Network Directory Obtained From a Remote Properties Cache Provided by an On-line Service" which claims priority from the U.S. application Ser. No. 08/516,978, now abandoned, filed on Aug. 18, 1995 which is a continuation-in-part of U.S. application Ser. No. 08/485,493, now abandoned, filed on Jun. 7, 1995.

FIELD OF THE INVENTION

The present invention relates to computer networks, and more particularly, relates to a system and method for providing users with a directory of the content of a computer network.

BACKGROUND

On-line services networks commonly provide end users with access to a variety of different types of content entities. These content entities may include, for example, executable programs that can be downloaded to the user's computer, communications services (such as chat and email services) that allow users to communicate with one another, bulletin board system (BBS) services that allow users to review postings on various topics, and publications services that provide users with access to old and new printed publications. The various content entities are typically made available to users via a network directory system which presents users with a hierarchical view of the network's content.

In copending U.S. application Ser. No. 08/472,807 having the title ARCHITECTURE FOR SCALABLE ON-LINE SERVICES NETWORK, filed Jun. 7, 1995, there is described an on-line services network architecture in which the various user-accessible content entities are distributed on a number of different servers of a network. For example, one group of servers runs a BBS service application (and stores all BBS postings), while another group of servers runs a Chat service. Various benefits are realized by this architecture over conventional, mainframe designs. For example, the network can easily be scaled in size to accommodate increased numbers of users.

The present invention is directed generally to the problem of providing an extensible directory service for a distributed on-line services network, such as a network of the type described in the above-referenced application. One goal of the invention is to provide users with a hierarchical view of a distributed network's content such that the distribution of content entities among different servers is not apparent to the end user. Another goal is to provide a directory that is seen by users as a single, homogeneous directory, rather than a collection of separate directories. Another goal is to provide a directory service that operates efficiently over a low-bandwidth communications channel, so that users do not experience significant delays while accessing the directory service over a wide area network. Another goal is to provide each user with a directory that is tailored to that user's particular access rights on the network. Another goal is to provide a directory service that is highly extensible, so that new content entities and entity types can easily be added as the network evolves. Another goal is to provide a directory service that is highly scalable in both content capacity and user capacity.

SUMMARY

In accordance with the present invention, a distributed directory service for an on-line services network is provided. The directory service comprises multiple different services, referred to as "Directory Service Providers," running on respective groups of application servers. Each Directory Service Provider stores and provides user access to a respective hierarchical directory structure (preferably in the form of a directed acyclic graph) which represents a subset of the content (i.e., the on-line services and service-related entities) available to users of the network. In a presently preferred implementation, the directory service includes two Directory Service Providers: a BBS service which provides a directory to BBS content, and a "Dirsrv" service which provides access to all other types of content. Users that connect to the on-line services network via a wide area network (WAN) can access the directory service to interactively explore and access the content of the network.

Each hierarchical directory structure preferably includes a plurality of interconnected nodes, including leaf nodes, folder nodes and junction point nodes. The leaf nodes represent specific services or service entities (such as Chat rooms, BBS messages, and download-and-run files) which may be accessed by users. The folder nodes represent collections of related leaf nodes, and are generally analogous to directories within a file system. The junction point nodes act as proxies for nodes (referred to as "target nodes") of other directory structures, and provide a mechanism for allowing users to move from one Directory Service Provider to another while exploring the content of the network. The junction point nodes thereby integrate the various directory structures into a single, hierarchical "content tree" from the viewpoint of end users.

Each node of the content tree, whether a leaf node, folder node or junction point node, includes a variable-length list of properties. These properties may include, for example, various character string properties which may be viewed by end users (such as a description property which provides a written description of the corresponding content), and various non-viewable properties which contain, for example, information needed to launch the appropriate client and server components of a corresponding-on-line service.

A preferred client application of the directory service reconstructs the hierarchical content tree on the screens of users, with the various nodes shown as corresponding icons (which are downloaded from the directory service) and/or textual names. Using the client application, users can navigate the content of the network by, for example, expanding folder nodes to expose lower levels of nodes, and by requesting the parents of a node to move upward within the content tree. Users can also view properties of nodes, and can open various on-line services (by, for example, double-clicking the icon of a leaf node).

In accordance with one aspect of the present invention, the specific actions that can be performed by a user at a given node depend upon the particular access rights of the user at the node. For example, a user with "view-only" level access rights at a node may only be permitted to view a limited set of properties (such as the description) of the node, while a user with "user" level privileges may be able to view the properties of the node and open a service that corresponds to the node. Users with "sysop" level privileges are advantageously given the capability to remotely edit certain properties of nodes. (As described below, a user may have no access rights at a node, in which case the user will not be able to see even the icon or the name of the node.) The access rights of users may vary from user-to-user and from node-to-node. In the preferred embodiment, the access rights of users are stored within an access rights database, and are obtained by the directory service using an API method which generates user-specific queries of the access rights database.

In accordance with another aspect of the invention, each node has a set of "local properties" that are stored locally by the respective Directory Service Providers, and may also have one or more "remote properties" that are provided by the remote service to which the node corresponds. Remote properties are advantageously stored by the Directory Service Providers within node-specific remote property caches. When a remote property of a node is requested by a client application, the Directory Service Provider initially checks the node's remote properties cache, and if the property is not found, forwards the request to the "remote" service to which the node corresponds. For example, a request for a remote property of a Chat room node would be forwarded by the Directory Service Provider to the Chat service. When the remote property is returned by the service, the Directory Service Provider returns the property to the client, and caches the property within the node's remote properties cache. The remote properties caches are refreshed periodically to ensure that the remote properties stored therein are up-to-date.

The remote properties feature of the present invention advantageously allows service data that changes frequently (such as the number of occupants of a Chat room) to be provided dynamically by the end services to which the nodes correspond. The remote properties feature is also useful for allowing certain properties of junction point nodes to be stored remotely by the Directory Service Provider of the junction point's target node.

In accordance with another aspect of the invention, a navigation application program interface (API) is provided which allows client applications to request node properties and other information needed to provide users with a navigable, hierarchical view of the content tree. This API is advantageously implemented (at least in-part) by all Directory Service Providers, so that a common set of navigation methods can be used to navigate the entire content tree. The provision of the navigation API facilitates the addition of new Directory Service Providers to the directory service, and thereby provides for a high degree of extensibility.

In accordance with another aspect of the invention, the methods of the navigation API allow client applications to specify the particular properties to be returned, so that only those properties needed by the client applications are transmitted over the WAN. This advantageously conserves WAN bandwidth, and increases performance from the viewpoint of the user.

In accordance with another aspect of the invention, each time a client application requests the properties of a node (by for example, calling a GetChildren method of the navigation API to obtain all children of a current node), the directory service checks the user's access rights to the node. If the user has no access rights with respect to the node (i.e., is not authorized to access the node), the directory service does not return the requested properties, and thereby prevents the user from seeing the node. Each user is thus provided with a user-specific, access-rights-filtered directory, seeing only those nodes (e.g., icons) to which the user has at least some access rights. This feature allows certain content objects (such as private folders of subgroups of users) to be completely hidden from certain classes of users, and thereby provides for a high degree of security against the unauthorized access to such objects.

In accordance with another aspect of the invention, a method is provided for allowing users to specify language and geographic region filters, and for using these filters to limit the nodes that are returned to the client application. In a preferred embodiment, the user-specified filters are passed to the directory service via a "locales" parameter of a navigation API method, and are compared against a locales list which is (optionally) stored as a property of each node. Nodes which do not have the locales (i.e., languages and/or. geographic regions) specified by the user are not returned. The user is thus provided with a customized, filtered directory of the network's content. This feature also conserves bandwidth over the WAN by preventing downloads of nodes in which the user has no interest.

In accordance with yet another aspect of the invention, the Directory Service Providers optionally store certain types of shared data items (i.e., data items that are shared by multiple nodes) within a shared database, rather than as properties of the nodes. Duplicate copies of shared data items on the same application server are thereby avoided. In the presently preferred implementation, icon bitmaps, sound files, banner objects and download-and-run files are stored within the shared database, and the nodes of the content tree have corresponding properties (Icon ID, Soundfile ID, Banner ID and Drfile ID) which can be used to reference these shared data items. Thus, for example 10 different nodes may share the same icon, in which case each such node will have the ID of the shared icon stored as an Icon ID property. Special methods of the navigation API provide for the downloading of the shared data items and for the enumeration of the shared data items of a given type.

BRIEF DESCRIPTION OF THE DRAWINGS

These and other aspects of the invention will now be described with reference to the drawings of a preferred embodiment, which is intended to illustrate and not to limit the invention, and in which.

Figure 1:
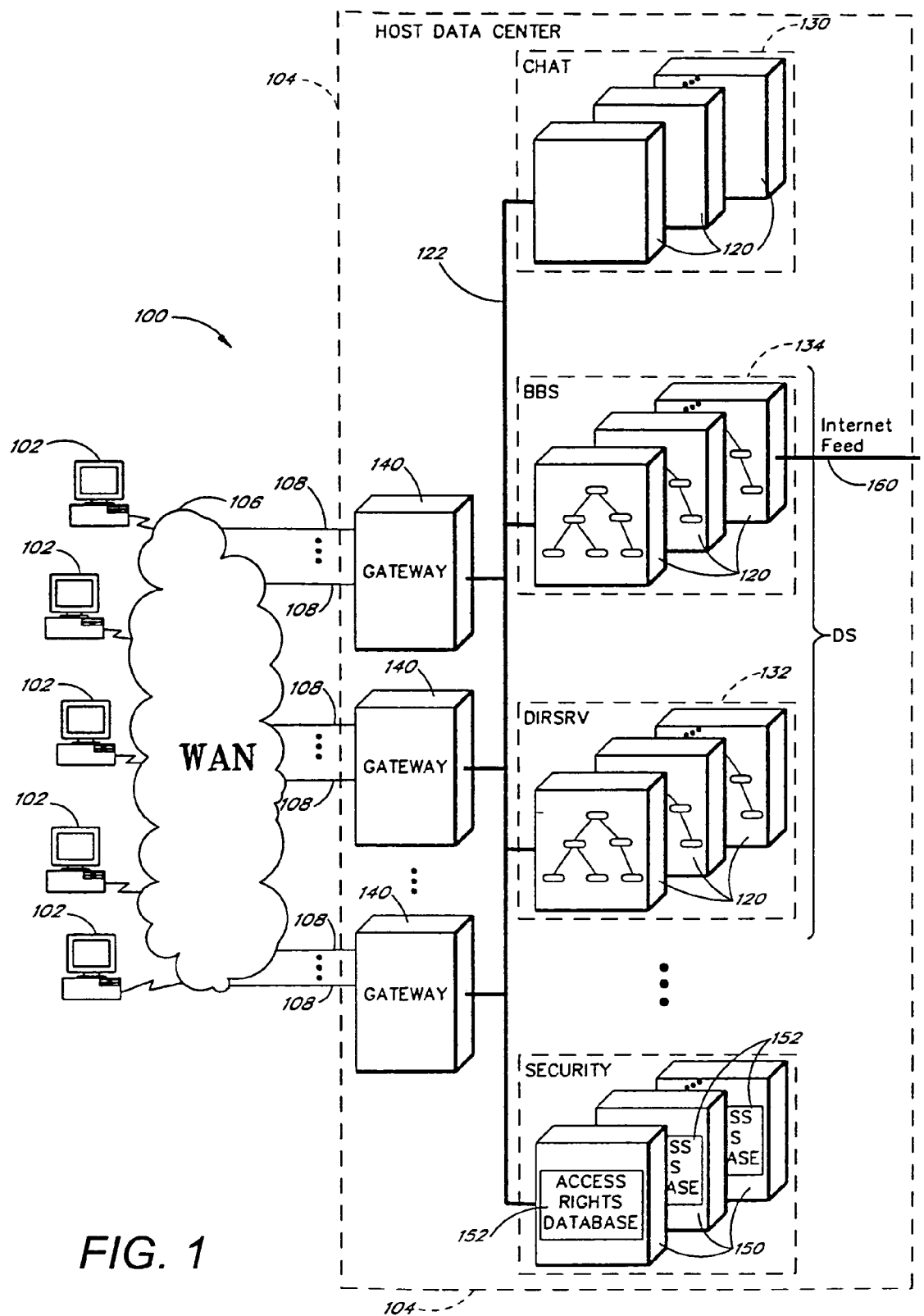
FIG. 1 is a high-level diagram illustrating the general architecture of an on-line services network which embodies the present invention.

Reference numbers in the drawings have three or more digits; the two least significant digits are reference numbers within the drawing, and the more significant digits indicate the figure in which the item first appears. For example, reference number 604 refers to an item which is first shown in FIG. 6. Like reference numbers indicate like or functionally similar components.

DETAILED DESCRIPTION OF A PREFERRED EMBODIMENT

Described herein is an extensible directory service which includes multiple, distinct services running on separate groups of application servers. Although the directory service is described with reference to a preferred embodiment of a distributed on-line services network, it will be apparent to those skilled in the art that various aspects of the directory service are applicable to other types of computer networks and network configurations.

For convenience, the description of the preferred embodiment is arranged within the following eleven sections:
1. ARCHITECTURAL OVERVIEW (FIG. 1);
2. OVERVIEW OF DIRECTORY SERVICE AND RELATED COMPONENTS (FIGS. 1-3);
3. CLIENT-SERVER ARCHITECTURE OF DIRECTORY SERVICE (FIG. 4)
4. REPRESENTATION OF NODE PROPERTIES (FIG. 5);
5. NODE DISK STRUCTURES (FIG. 6);
6. SHABBIES (FIG. 7);
7. SERVER MEMORY STRUCTURES AND OPERATION (FIGS. 8 AND 9);
8. JUNCTION POINTS (FIGS. 10A AND 10B);
9. TREENAV METHODS;
10. LOCALES AND ACCESS RIGHTS FILTERING OF NODES (FIG. 11); and
11. OTHER EMBODIMENTS.

The first of these sections provides an architectural overview of the preferred on-line services network in which the present invention is embodied. The architecture of this network is further described in the above-referenced application having the title "ARCHITECTURE FOR SCALABLE ON-LINE SERVICES NETWORK" (U.S. Ser. No. 08/472,807), which is incorporated herein in by reference.

Throughout the following description, the first letters of the names of specific services on the network will be capitalized (for example, "Chat," "BBS," and "Directory Service"). Additionally, the names of specific software methods and interfaces will be provided in mixed case (for example, "GetChildren," "GetAccountRights" and "TreeNav.")

1. Architectural Overview (FIG. 1)

FIG. 1 is a high-level diagram illustrating the general architecture of an on-line services network 100 which provides a directory service in accordance with the present invention. Multiple client microcomputers 102 are connected to a host data center 104 by a wide area network (WAN) 106. The wide area network 106 includes WAN lines 108 which are provided by one or more telecommunications providers, and which allow end users (i.e., users of the microcomputers 102) over a wide geographic area to access the host data center 104. The WAN lines 108 preferably include both X.25 lines and ISDN (Integrated Service Digital Network) lines. The host data center 104 provides a variety of information-related and communications-related on-line services to end users.

The host data center 104 comprises a plurality of application servers 120 connected to one or more high speed local area networks (LAN) 122. The application servers 120 are preferably Pentium-class (or better) microcomputers which are scalable to at least four central processing units (CPUs), and which run the Microsoft Windows NT operating system available from Microsoft Corporation. Each application server 120 typically has at least 128 MB of random-access memory (RAM) and at least 4 GB of disk space.

The application servers 120 are arranged into service groups (also referred to as "AppGroups") that correspond to specific on-line services. Three example service groups are shown in FIG. 1: a Chat service group 130, a Bulletin Board System (BBS) service group 134, and a Dirsrv service group 132. Additional service groups (not shown) are provided to implement other on-line services, including a Mediaview service which provides multimedia titles to end users, a mail service, a Component Manager service which allows users to update client software when new releases become available, and a File Transfer Manager (FTM) service. Other on-line services may include, for example, an interactive games service, a weather service, and a World Wide Web browsing service. A service group can have as few as one application server 120. System administrators can adjust the number of application servers 120 in a given service group to accommodate the current usage level of the corresponding service. For example, application servers 120 can be added to the BBS service group 134 to increase the user capacity of the BBS service.

Also connected to the LAN 122 are multiple Gateway microcomputers 140 (hereinafter "Gateways") which link incoming calls from end users to the application servers 120. The Gateways 140 are preferably Pentium-class microcomputers which are scalable to at least four CPUs, and which run the Microsoft Windows NT operating system. Each Gateway 140 typically has at least 64 MB of RAM and at least 2 GB of disk space, and is capable of supporting approximately 1000 simultaneous user connections.

Also connected to the LAN 122 are multiple security servers 150. The security servers 150 are preferably Pentium-class microcomputers which are scalable to at least four CPUs, and which run the Microsoft Windows NT operating system. Each security server 150 maintains a relational database 152 which contains the access rights data for all users of the network 100. Each security server 150 runs Structured Query Language (SQL) code to provide access to its respective access rights database 152. SQL is a language standardized by the International Standards Organization (ISO) for defining, updating and querying relational databases. A query to the access rights database 152 can emanate either from one of the application servers 120 (when, for example, a user attempts to access a content entity which is stored by the application server 120), or by one of the Gateways 140 (when a user attempts to open an on-line service). Each machine 120, 140 which generates queries of the access rights databases 152 preferably implements an access rights cache for locally storing user-specific access rights information obtained from the database 152.

Various other types of servers and other microcomputers are connected to the LAN 122 but are not shown in FIG. 1. For example, billing and logon servers are provided to record billable events and to handle user logon, respectively. Further, Arbiter microcomputers are provided to perform transaction replication services for certain service groups (including both the Dirsrv service group 132 and the BBS service group 134), allowing the application servers 120 of such service groups to store identical copies of the same service content data.

It is envisioned that the host data center 104 may have on the order of one hundred Gateways 140, and between several hundred and several thousand application servers 120. A host data center of this type will be able to handle millions of subscribers and tens of thousands of simultaneous user logon sessions. Advantageously, the processing capacity of the host data center 104 can easily be increased (to support new services, and to support increases in the number of subscribers) by connecting additional Gateways 140 and application servers 120 to the LAN 122, and by adding additional local area networks. Further, additional host data centers 104 can be provided at different geographical locations to accommodate a wide geographic distribution of subscribers.

The on-line services offered to end-users of the network 100 are preferably in the form of client-server application programs or "service applications". Each service application includes a server portion that runs on one or more of the application servers 120, and at least one corresponding client portion (also referred to as a "client application" or "client") that runs on a microcomputer 102 of an end user. In the presently preferred embodiment, the client applications are in the form of Microsoft Windows 95 executables, and the server portions are implemented as dynamic link libraries running under the Microsoft Windows NT operating system.

With reference to FIG. 1, the server portions of the various on-line services are implemented on the application servers 120 of the respective service groups 130, 132, 134. Each application server 120 of a given service group separately runs the same server application. For example, each application server 120 of the Chat service group 130 runs CHAT-.DLL, which is a dynamic link library that implements the server portion of the Chat service. Similarly, each application server 120 of the BBS service group 134 runs a BBS dynamic link library, and each application server 120 of the Dirsrv service group 132 runs a Dirsrv dynamic link library. Although each application server 120 is shown in FIG. 1 as being allocated to a single service group, a single application server can simultaneously run multiple service applications, and can thus be allocated to multiple service groups. For example, a single application server 120 could run both the Chat and BBS dynamic link libraries and thus be allocated to both the Chat and BBS service groups 130, 134.

During a typical logon session, a client microcomputer. 102 will maintain a communications link with a single Gateway 140, but may access multiple on-line services (and thus communicate with multiple application servers 120). To initially access a service, an "open" request is generated on the client microcomputer 102 and sent to the Gateway 140 that is handling the logon session. The Gateway 140 then selects a single application server 120 (of the appropriate service group) to handle the service session, and opens a pipe (e.g., a TCP/IP connection) over the LAN 122 to the selected application server 120.

Throughout the service session, the Gateway 140 routes messages between the client microcomputer 102 and the application server 120 as the client and server portions of the service application communicate. The Gateway 140 also performs protocol translation between the protocol of the WAN 106 and the protocol of the LAN 122. To terminate the service session, a "close" request is generated on the client microcomputer 102 and sent to the Gateway 140, and the Gateway 140 closes the pipe to the application server 120 that is handling the service session.

The architecture advantageously supports multiple simultaneous service sessions per user. Thus, a user may be connected to multiple applications servers (via the Gateway 140 handling the logon session) simultaneously.

Two specific on-line services, Chat and BBS, will now be briefly described. This description will illustrate some of the specific types of content entities (referred to herein as "content objects," or simply "objects") which may be accessed by users.

The Chat service is an interactive communications service which allows users to have real time conversations with other users on specific topics. Chat conversations or "conferences" are organized as "Chat rooms" which may be entered or exited by end users to join or leave the corresponding conferences. For example, an end user may enter a "sports" Chat room to join an interactive conversation on sports-related topics. Participants in a Chat conference can type in textual messages which will be displayed on the monitors of other participants. Voice and/or video capabilities may additionally be provided.

The BBS service allows users to post and/or review messages. Users can thereby ask and answer questions, or otherwise conduct non-real-time conversations with other users. Although shown as a single BBS service group 134 in FIG. 1, multiple BBS service groups may be formed, with each corresponding, for example, to a particular topical area. In the preferred implementation depicted by FIG. 1, replicated copies of all BBS content (e.g., BBS messages and folders) are stored on each application server 120 of the BBS service group 134. This allows the BBS application servers 120 to independently process message read requests from end users. Replication of BBS content is accomplished using the Arbiter transaction replication service. A preferred embodiment of the Arbiter service is described in commonly-assigned copending U.S. application Ser. No. 08/485,493, filed Jun. 7, 1995, having the title TRANSACTION REPLICATION SYSTEM AND METHOD FOR SUPPORTING REPLICATED TRANSACTION-BASED SERVICES, which is incorporated herein by reference.

With reference to FIG. 1, one of the application servers 120 of the BBS service group 134 is preferably configured as an Internet feed server 120. The BBS Internet feed server 120 reads Internet newsgroup messages and posts these messages (by submitting update transactions to the Arbiter service) within the BBS service group 134, thereby providing users with access to such newsgroup messages. The BBS Internet feed server 120 is also used to post messages to the Internet.

Chat rooms and BBS messages are two types of content objects that may be accessed by users. The ability to access a given content object, and the access rights of the user with respect to that object, may vary from user to user. Using a Chat room object as an example, some users may be "participants" who can participate in the conference, while other users may be "viewers" who can only view the text of the conversation. One or more users may further be designated as a "host" of the conversation. A host normally has the responsibility of moderating the conversation, and has the ability to modify the access rights of members of the conversation with respect to the Chat room.

Figure 2:
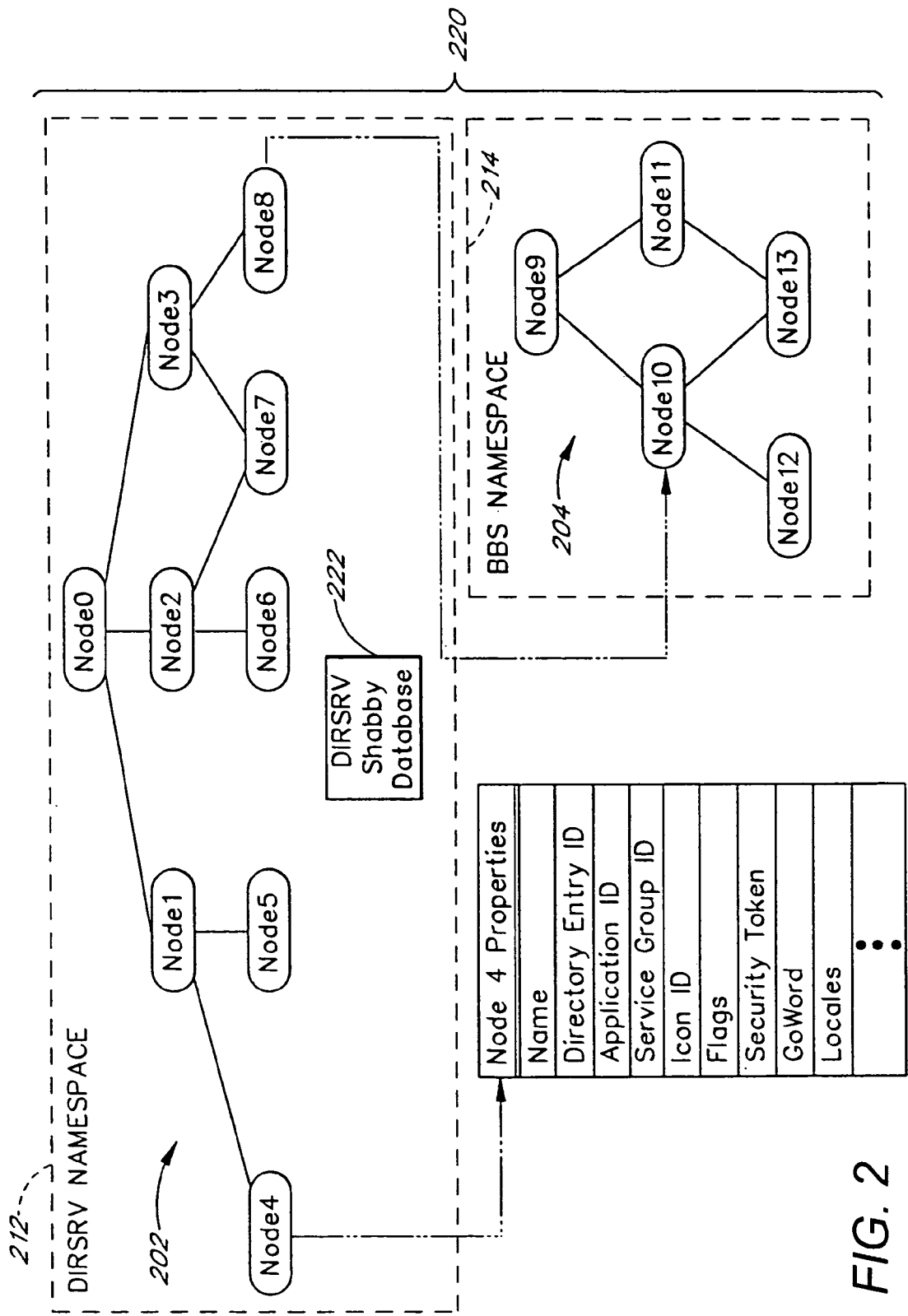
FIG. 2 illustrates how the content of the on-line services network of FIG. 1 is preferably mapped into multiple hierarchical, tree-like directory structures of nodes, with each node being in the general form of a list properties.
Figure 3:
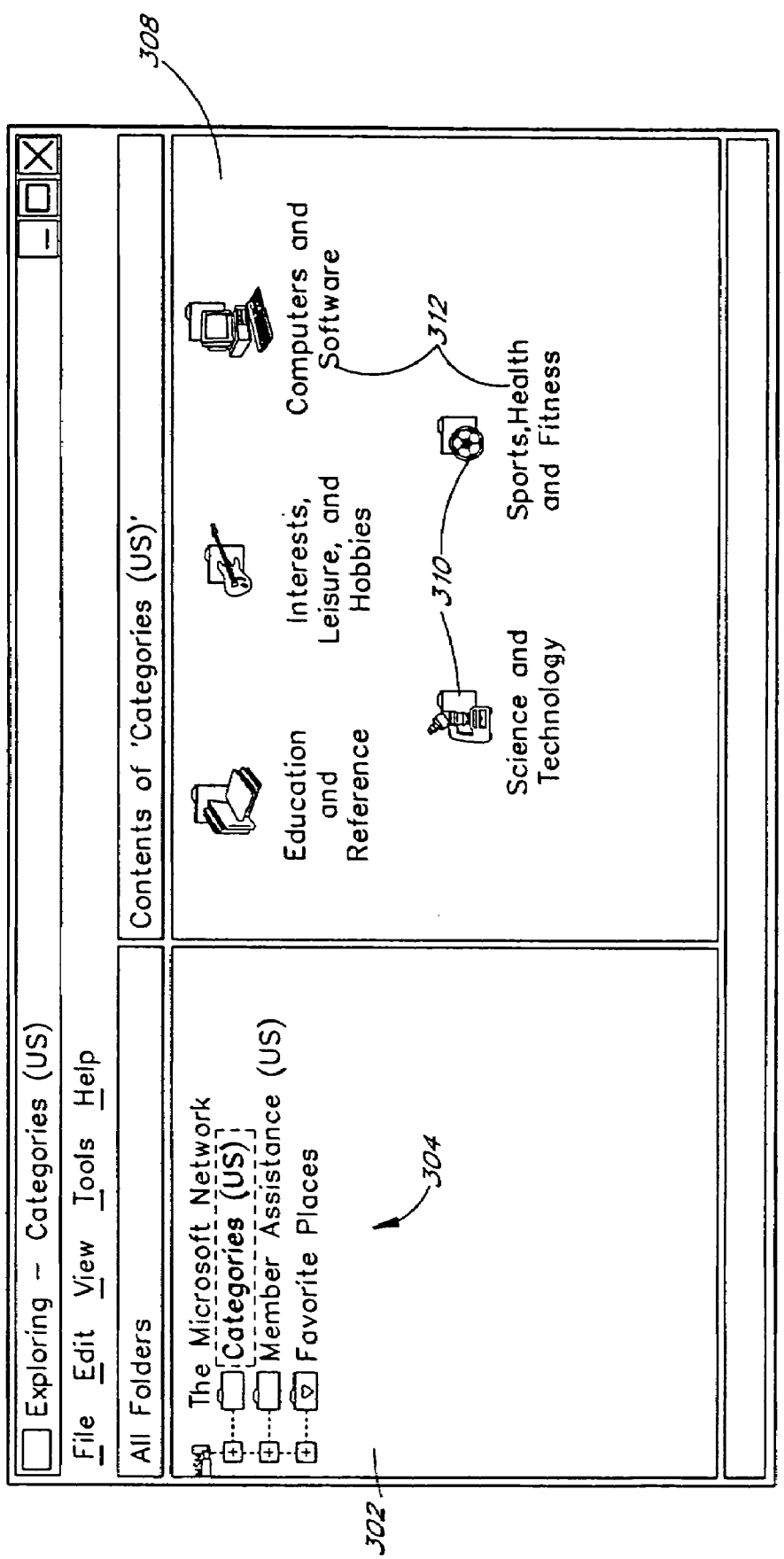
FIG. 3 illustrates a preferred graphical user interface which presents users with a hierarchical, navigable view of the content of the directory structures of FIG. 2.

2. Overview of Directory Service and Related Components (FIGS. 1-3)

The Directory Service is an extensible on-line service that contains databases which describe the various content entities (i.e., the on-line services and associated data entities) of the network 100 that are accessible to users. Access to these databases is provided via navigation and edit application program interfaces (APIs) of the Directory Service. Through these interfaces, users are provided with a hierarchical, navigable view of the various content objects available on the network 100, and are provided with a mechanism for accessing the content objects.

The Directory Service is advantageously distributed among different on-line services, which are referred to herein as "Directory Service Providers." Each Directory Service Provider provides a directory to a subset of the content of the network 100. In a presently preferred implementation described herein, the Directory Service is implemented by two Directory Service Providers, the Dirsrv service and the BBS service. As will be apparent from the description that follows, however, the Directory Service supports the addition of an indefinite number of other Directory Service Providers. Accordingly, the preferred embodiment will be described herein in terms of both (1) an extensible Directory Service architecture which supports an indefinite number of Directory Service Providers, and (2) a two-Directory-Service-Provider implementation of the Directory service.

Each Directory Service Provider maps its content into a hierarchical directory structure, which is stored within a corresponding "provider namespace." In accordance with one aspect of the present invention, a seamless interface is provided to allow the user to transparently move from one directory structure to another, so that the multiple directory structures (of the multiple Directory Service Providers) appear to the end user as a single directory structure, and so that the Directory Service appears as a single service. This feature of the invention is described in detail below.

With reference to FIG. 1, the Directory Service (abbreviated as "DS" in FIG. 1) includes the Dirsrv service (implemented on the Dirsrv service group 132) and the BBS service (implemented on the BBS service group 134). The Dirsrv service is the "root" of the Directory Service, and provides users with a hierarchical, navigable view of all non-BBS content objects (such as Chat rooms and Mediaview titles). The BBS service provides users with a hierarchical, navigable view of all BBS content objects.

With reference to FIG. 2, which illustrates the general organization of content objects as maintained by the Directory Service, each Directory-service Provider maintains a respective directory structure 202, 204 that represents a hierarchy of content objects. Each directory structure 202, 204 is comprised of multiple interconnected nodes, with each node representing a corresponding content object (or collection of content objects) which may be accessed via the corresponding Directory Service Provider. The Dirsrv directory structure 202 is stored within a Dirsrv namespace 212, and is stored on the application servers 120 of the Dirsrv service group 132. The nodes of the Dirsrv directory structure 202 represent the content objects which may be navigated and accessed via the Dirsrv service. The BBS directory structure 204 is stored within a BBS namespace 214, and is stored on the application servers 120 of the BBS service group 134. The nodes of the BBS directory structure 204 represent the content objects which may be navigated and accessed via the BBS service.

The Dirsrv and BBS namespaces 212 and 214 are both provider namespaces. As described below, a seamless interface between the Dirsrv and BBS services allows users to transparently traverse between the two directory structures 202, 204, so that the Directory Service appears as a single service to end users, and so that the two directory structures 202, 204 are seen by users as a single tree-like directory structure.

Advantageously, additional Directory Service Providers (and additional provider namespaces) can be added to the Directory Service. For example, an investment service that provides data on stocks and mutual funds could be added which acts as a Directory Service Provider with respect to its own content, and this content would be stored within a separate directory structure that is linked to the other directory structures 202, 204. The investment service would preferably be implemented on its own, separate group of application servers 120.

As will be apparent from the following description, the addition of new Directory Service Providers increases the content capacity (i.e., the total number of nodes which can be stored) of the Directory Service. In addition to this ability to increase the content capacity of the Directory Service, the capacity of a given Directory Service Provider to service users can advantageously be increased by the addition of application servers 120 to the corresponding service group.

In accordance with one aspect of the present invention, the Directory Service is accessed via a navigation API, referred to herein as the "TreeNav" API, and via an edit API, referred to herein as the "TreeEdit" API. These APIs may be implemented in whole or in part by the different Directory Service Providers. As will be apparent to those skilled in the art, the provision of the TreeNav and TreeEdit APIs greatly facilitates the addition of new Directory Service Providers, and thereby provides for a high degree of extensibility.

With further reference to FIG. 2, each directory structure 202, 204 may have thousands of nodes, and could thus represent thousands of content objects. The nodes can generally be thought of as "service areas" that can be entered by users. Links between nodes represent paths that can be taken by users in traversing the hierarchical structures 202, 204 from one service area to another. The specific nodes and links shown in FIG. 2 are provided to show the general manner in which nodes are arranged, and do not represent an existing directory structure.

In accordance with the present invention, the Directory Service Providers are free to use any database arrangement for the storage of their respective nodes. In the preferred embodiment, the Directory Service Providers store their respective nodes as node files of a filesystem, with each node file containing a list of node properties that represents a single node. Various other database arrangements are possible. For example, a Directory Service Provider could be configured to store its nodes within an SQL (Structured Query Language) database.

The hierarchical directory structures 202, 204 are preferably in the form of directed acyclic graphs. As is well known in the art of file systems, a directed acyclic graph structure is more flexible than a strict tree structure, since a directed acyclic graph allows a node to have multiple parent nodes. (A "parent" of a given node is any node that is both (1) directly connected to the given node, and (2) at a higher level in the hierarchy than the given node. Similarly, a "child" is any node that is both (1) directly connected to the given node, and (2) at a lower level than the given node.) This characteristic of the directory structures 202 and 204 is illustrated by nodes 7 and 13, each of which has two parent nodes. In other embodiments of the invention, a strict tree structure may be used.

With reference to FIG. 2, the extensible, composite structure 220 formed by the two directory structures 202 and 204 (and other directory structures which may be added) will be referred to herein as the "content tree." This use of the term "tree," however, is not intended to suggest that the composite structure 220 is a strict tree structure.

As will be appreciated by those skilled in the art, the provision for multiple Directory Service Providers that are seamlessly linked to one another advantageously allows the task of providing a directory service to be distributed among multiple, different services. This is particularly advantageous when the volume of the content on the network 100 is sufficiently high such that a single service cannot efficiently store and provide access to all node. Conversely, the ability to distribute the Directory Service among a variable number of services enables the content tree 220 to be expanded (by the addition of new nodes) without a corresponding degradation of performance.

As will further be appreciated, because different Directory Service Providers store and provide access to different types of nodes, each Directory Service Provider can be tailored to the specific requirements of the type or types of nodes stored by that Directory Service Provider, without concern for the specific requirements of other types of node. By way of specific example, only the BBS service needs to include code for monitoring and deleting old BBS message nodes, since the BBS service is the only Directory Service Provider that stores BBS message nodes. This feature of the present invention will be apparent from the description that follows.

In the preferred embodiment, the content tree 220 is displayed to the end user via a network shell application which runs on the client microcomputers 102 of end users. The network shell is the primary client of the Directory Service. A preferred implementation of the network shell is described in a commonly-assigned U.S. application having the title ON-LINE NETWORK ACCESS SYSTEM, filed Jul. 17, 1995, which is incorporated herein by reference. In the preferred embodiment, the network shell is an integral part of the Microsoft Windows 95 Explorer program (hereinafter "the Explorer"), which is described in *Inside Windows* 95, Microsoft Press, 1994. As will be apparent to those skilled in the art, other types of shell applications could be used. As described below, a graphical user interface of the Explorer displays the content objects as a logical extension of the user's hard drive, with nodes represented by corresponding icons on the user's screen.

In accordance with the present invention, the content tree 220 includes three different types of nodes: leaves, folders and junction points. A set of flags stored in association with each node identifies the node as one of these three types. Leaves (or "leaf nodes") are nodes that both (1) cannot have children and (2) do not serve as junction points. The leaf nodes in FIG. 2 are nodes 4-7, 12 and 13 (assuming that these nodes cannot have children). Leaves represent the actual services within network 100. Examples of leaves include Chat rooms, BBS messages, Mediaview titles and download-and-run files. When the user clicks on a leaf node (by double clicking on the double corresponding icon from a window of the Explorer), the corresponding service-related action is taken. For example, if the user double clicks on a Chat room icon, the Chat service is opened and the user is added to the corresponding Chat conference. When the user double clicks on an icon for a download-and-run file, the file is downloaded to the user's computer 102.

Folders are nodes that both (1) can have children, and (2) do not serve as junction points. The folder nodes in FIG. 2 are nodes 0-3 and 9-11. Folder nodes normally represent collections of other content objects, and are used to organize the content of the network. For example, a folder node may correspond to a BBS folder on a particular topic, or may represent a collection of BBS folders and Chat rooms on a related topic. Folder nodes are also used to generally arrange content objects according to language. For example, node 1 may be an english folder containing content objects that are primarily in english, and node 2 may be a spanish folder containing content objects that are primarily in spanish. Folder nodes are generally analogous to the directories of a file system.

Junction points are nodes that serve as proxies for nodes in other provider namespaces and that allow the user to seamlessly traverse between provider namespaces. The only junction point shown in FIG. 2 is node 8, which serves as a proxy for BBS folder node 10 (referred to as the "target node"). When, for example, the user double clicks on node 8, the Explorer launches a BBS navigator and shows the user the children of node 10. Although only a single junction point is shown in FIG. 2, many junction points may be provided within the content tree 220. Junction points are discussed in detail below under the heading JUNCTION POINTS.

With reference to FIG. 3, a graphical user interface of the Explorer displays the content tree 220 as a logical extension of the user's hard drive. In the window configuration shown, the left-hand window pane 302 displays a hierarchical map 304 of folder nodes, and the right-hand window pane 308 displays the icons 310 and names 312 of the content objects within a selected folder node. The hierarchical map 304 corresponds to a portion of the content tree 220. In the example shown in FIG. 3, the map 304 includes three folder nodes with names of "categories (US)," "Member Assistance (US)," and "Favorite Places," and the right-hand window pane 304 displays the contents of the "Categories" folder (which has been selected by the user from the left-hand pane 302).

Using the Explorer, users can browse the content tree 220 and can access the various content objects. Various actions are available to the user to reveal different levels of nodes. For example, the user can click on a folder displayed in the left pane 302 to "expand" the folder, or can click on a "parent folder" button (not shown) to move upward through the content tree. To access a content object (to, for example, enter a specific on-line service), the user can double click on the icon for that object. Because the content tree 220 is preferably structured as an acyclic graph, the user may take different paths to get to the same content object. The particular actions which can be performed by a user upon accessing a node depend upon the user's access rights with respect to the node, which are stored within the access rights databases 152 on the security servers 150. Access rights of users can advantageously be specified within the database on a single-user basis.

In accordance with one aspect of the present invention, the Directory Service only "shows" to each user those nodes that the user is authorized to access, or equivalently, those nodes to which the user has access rights. (In the preferred embodiment, the lowest level of access rights a user can have at a node is "viewer-only." A user with viewer-only level access rights at a node can view-certain properties of the node, but cannot either modify the properties or open the corresponding service.) Thus, each user is provided with a filtered view of the actual content of the network 100, seeing only the icons of the nodes that the user is authorized to view or otherwise access.

This feature of the invention advantageously allows certain nodes and content objects to be completely hidden from certain classes of users. For example, this feature may be used to hide from the view of regular users a BBS folder (and its contents) that has been created for private correspondence between members of a family, so that the only users who can see the folder from the Explorer are the designated family members. Because only those authorized to access each node can see the node, a high degree of security is provided against unauthorized accesses.

In the preferred embodiment, a Sysop Tools client application (which is preferably integrated with the Explorer) allows authorized end users to remotely edit the content tree 220. Edits to the content tree can also be made locally (i.e., from within the host data center 104) by system administrators. Edits to the content tree 220 are made via the methods of the TreeEdit API, which are implemented by the various Directory Service Providers. These methods include methods for adding and deleting nodes, and for editing the properties of existing nodes. The capability of a user to edit the content tree 220 is specified by the user's access rights. To determine the access rights of users, the Directory Service Providers generate user-specific queries of the access rights database 152 (using a GetAccountRights API, as described below under the heading LOCALES AND ACCESS RIGHTS FILTERING OF NODES).

Users that have the capability to edit the content tree 220 are generally referred to as "sysops," although different levels of sysops are defined. Advantageously, different users can have different edit capabilities with respect to different nodes. For example, one user may have node edit privileges (or "sysop privileges") only at a particular Dirsrv folder node (plus any children of the Dirsrv folder node), while another user may have node edit privileges only at a particular BBS folder node (plus any children of the BBS folder node).

As a user moves from node to node of the content tree 220 using the Explorer, the Explorer requests the node-specific access rights of the user from the Directory Service. If these access rights indicate that the user has sysop privileges at a particular node, the Explorer advantageously displays a set of node edit menu items, allowing the user to remotely edit the properties of the node using the TreeEdit API. A preferred set of tools for remotely editing the content tree 220 is described in a concurrently filed, commonly assigned U.S. application having the title SYSTEM AND METHOD FOR EDITING CONTENT IN AN ON-LINE NETWORK, which is incorporated herein by reference.

As pictorially illustrated in FIG. 1, the Dirsrv directory structure 202 is stored on each of the application servers 120 of the Dirsrv service group 132. Similarly, the BBS directory structure 204 is stored on each of the application servers 120 of the BBS service group 134. Accordingly, any single application server 120 within the Dirsrv service group 132 can provide a directory of all of the nodes within the Dirsrv namespace 212, and any single application server 120 within the BBS service group 134 can provide a directory of all of the nodes within the BBS namespace 214. As with other service groups within the host data center 104, each service group 132, 134 may have as few as one application server 120.

As indicated above, the Directory Service Providers may store their respective nodes as node files, or may use an alternative database arrangement. In the preferred embodiment, each node includes a listing of the parents and children of the respective node, and thereby specifies the position of the node within the content tree 220. With reference to FIG. 2, each node also includes a variable-length list of node properties, as illustratively shown for node 4. These node properties essentially define the corresponding content object (or "service area"), and specify how the content object may be accessed.

The node properties stored by the Directory Service Providers vary according to node type. For example, some properties are applicable only to folder nodes, some are applicable only to leaf nodes, and some are applicable to both leaf and folder nodes. Further, some properties are service-specific, meaning that they apply only to a certain service. An example of a service-specific property is a Chat room "maximum occupancy" property, which specifies the maximum number of users that can concurrently participate in a corresponding Chat conference. Further, some properties can be viewed by regular users (i.e., non-sysops) via a properties dialog box of the Explorer, while other properties are hidden from regular users, and can be seen only by sysops and/or system administrators.

In accordance with the present invention, a set of generic (i.e., non-service-specific) properties is defined to allow Directory Service Providers to store certain types of information. The mnemonic names and descriptions of these generic properties are provided below. Provided in parenthesis following each name and description is a list of codes which identify certain characteristics of each generic property. These codes are defined in Table 1.

TABLE 1

| CODE | MEANING |
| --- | --- |
| V/NV | Property is/is not visible to users via the properties dialog box of the Explorer |
| F | Property applies to folder nodes |
| L | Property applies to leaf nodes |

The generic properties are as follows:

Name. This is a human readable name, which can be displayed by a client (i.e., client application) of the Directory Service. For example, a folder node could have the name "Health & Fitness," and could have children folder nodes with names of "Health & Fitness Chat" and "Health & Fitness BBS." Every folder node and every leaf node has a name. For junction point nodes, the name of the target node is used (i.e., the property is stored remotely as a local property of the target node). In the preferred embodiment, the Explorer (which, as indicated above, is the primary client of the Directory Service) displays the name along with or in place of the corresponding icon. (V, F, L). Directory Entry ID (DEID). This is a 64-bit number which uniquely identifies a node within its respective provider namespace. (A provider namespace can thus have up to $2^{64}$ nodes.) Every node has a DEID. (NV, F, L).

Application ID (APPID). This is a 32-bit number that is required of every node. For leaf nodes, this number identifies the client application associated with the node, and is used by the Explorer to launch this client application when the user double-clicks on the node. (The client application then opens a pipe to the associated service.) For folder nodes, the APPID indicates the provider namespace (e.g., Dirsrv or BBS) in which the node resides. (The Directory Service can thus support up to $2^{32}$ different namespaces.) For junction point nodes, the APPID indicates the provider namespace in which the target node resides. (NV, F, L)

Service Group ID. (Also referred to as the data set ID, or "Dset".) This is a 16-bit number which identifies the service group (132, 134, etc.) of the Directory Service Provider in which the node resides. Every node has a service group ID. Each Directory Service node is uniquely identified globally by the combination of the node's DEID, APPID and Service Group ID. (NV, F, L).

Icon ID. This is a 32-bit number (in the form of a "shabby ID," as described below) which identifies the icon to be displayed by the Explorer (or other client) as a representation of the node. Icon bitmaps are stored by the Directory Service, and are sent over the network upon request by the Explorer. Multiple nodes may have the same icon. (NV, F, L).

Flags. This is an 8-bit value which indicates whether the node is a folder, leaf, or junction point. Every node has the Flags property. (NV, F, L).

Security Token. This is a 32-bit value which identifies a content category to which the node has been assigned for security (i.e., access rights) purposes. When a user attempts to view or access a node, the node's security token and the user's 32-bit account number are used to determine the user's access rights with respect to the node. Every folder node and every leaf node has a security token. For junction point nodes, the security token of the target node is used. (NV, F, L).

Description. This is a human-readable textual description of the service area corresponding to the node. The Directory Service places no limitation on the length of the description. (V, F, L).

GoWord. This is an optional property of nodes in provider namespaces that support GoWord searches. GoWords are in the form of character strings. If a Directory Service Provider supports GoWord searches, then the GetDeidFromGoword API (discussed below) can be used to retrieve the DEID of the node with a particular GoWord, and the node can then be directly accessed (assuming the user is authorized to access the node). Two nodes within the same provider namespace cannot have the same GoWord. (V, F, L).

Search Keywords. These are search words which may optionally be specified by sysops to permit keyword searching for nodes on particular topical areas. Multiple search keywords may be specified for a single node. The search keywords are cross-referenced to the corresponding node by a "find" service. (V, L, F).

Owner. This is a 32-bit vendor ID which identifies the entity which provides or derives revenue from the corresponding service. (V, F, L).

Sysops. These are the names of the users that are sysops of the node. (V, F, L).

Pricing. This is a 32-bit value which indicates the cost to the user, if any, associated with accessing the corresponding service area. For example, the pricing property of a node for a Chat room specify a cost to the user of $1.50 per use, or $2 per hour. The general format of the pricing property is described below. (V, F, L).

Rating. This is a 32-bit value which specifies a suggested appropriate audience for the content which corresponds to the node. Ratings include "GA: General Audiences," "MA-13: Mature Audiences," and "AO: Adults Only." (V, F, L)

Run Info. This is a localized string containing miscellaneous run-time information needed (for certain nodes) to start or open a pipe to a service. For example, the property could contain a filename or other moniker that specifies a file on an application server 120. (NV, L).

Locales. This optional property is in the form of a string of locales identifiers ("LCIDs") that identify the locales (i.e., languages and/or geographic regions) to which the node has been customized (or in which the node is viewable). For example, the locales property of a node that includes a textual description (or audio narration) that is in spanish may have only the LCID for "spanish" (which may be set by a sysop who creates the node); the locales property of a node for a rock music audio clip may include the LCIDs of many different languages and/or regions. In one embodiment, the locales property may be used to specify a geographic region to which the content object applies. Thus, for example, the locales property of a "classified ads" BBS node that is directed to residents of Daytona Beach Fla. may have the LCID for Daytona Beach. As described below, the Directory Service provides a mechanism for allowing the client to specify the locales that the user is interested in, and for filtering out any nodes that are not in any of the user-specified locales. This advantageously prevents the unnecessary downloading and viewing of nodes in which the user has no interest. (V, F, L).

Junction. For junction point nodes, this is the DEID of the target node. (NV).

Parents. This is the number of parents of the node. The Directory Service determines this number on-the-fly (rather than storing the number) upon request from the client. (NV, F, L).

Children. This is the number of children of the node. The Directory Service determines this number on-the-fly (rather than storing the number) upon request from the client. (NV, F).

Access Rights. This is a sixteen bit value, retrieved by the Directory Service from an access rights database 152, which specifies the access rights of a particular user at the node. Each defined bit of this value serves as a privilege level flag for indicating whether or not the user has a particular privilege level at the node. In the preferred embodiment, the user can have one or more of the following privilege levels: viewer, observer, user, host, sysop, sysop manager, supersysop. Although the access rights value is technically not a property of the node (since the value may vary from user to user), it is made available to the client by the Directory Service as a node property. (NV, F, L).

Soundfile ID. This is a 32-bit number (in the form of a shabby ID, as described below) which identifies a sound file that corresponds to the node. The various sound files are stored by the Directory Service separate from the node properties, and are provided to the client upon request. Each sound file specifies a corresponding sound or set of sounds that may be generated by the client microcomputer 102 when the user accesses the node. (NV, F).

Banner ID. This is a 32-bit number (in the form of a shabby ID, as described below) which identifies a banner object for providing a folder-specific banner within the right window pane 308 of the Explorer when the user opens a folder. Various graphics formats for specifying banners are supported, including bitmaps and various metafile formats. (A metafile is a standard Microsoft Windows graphics object that consists of lists of primitive graphics commands.) Banner objects are stored by the Directory Service separate from the node-properties, and are provided to the client upon request. (NV, F).

Drfile ID. (Download-and-run file ID). This is a 32-bit number (in the form of a shabby ID, as described below) which identifies a download-and-run file for the node. In the preferred embodiment, download-and-run files are small files (usually less than 5 kilobytes) that sysops can place in their folders to provide information (such as information on the standards of on-line conduct) to users. The various download-and-run files are stored by the Directory Service separate from the node properties, and are provided to the client upon request. (NV, L).

Throughout this detailed description, the first letter of each of the above-listed mnemonic property names is capitalized to emphasize that these names correspond to defined properties. Further, acronyms (such as DEID, and APPID) of mnemonic property names will be fully capitalized.

In addition to the properties listed above, various other generic properties are possible. For example, generic properties may be included to specify the creation date of the node, the date/time of the last modification to the node, the time frame (e.g., 12th-century) to which the content of the node relates, the version of the node, or the DEIDs of other nodes to which the present node is related.

As indicated by the foregoing, the only properties that are required of all nodes in the preferred embodiment are the DEID, APPID, Service Group ID and Flags properties. The Name and Security Token properties are required of all leaf and folder nodes, and the Junction property is required of all junction point nodes. The remaining properties are optional, meaning that they may or may not be specified (depending upon the particular service with which the node is associated). As described below, a set of node editors are provided to inform the Explorer, for each service, of the properties which may be entered by sysops for the nodes of that service. These node editors also allow nodes to have service-specific properties, such as the above-mentioned maximum occupancy property. Typically, the set of properties that may be specified for a given node type (such as Chat room leaf nodes, or BBS folder nodes) includes a subset of the above-listed generic properties, and may include one or more service-specific properties.

As will be recognized from the foregoing, each node is simply a list of properties stored by or otherwise available via the Directory Service. This list of properties describes the corresponding service area (or content object) on the network, and in the case of leaf nodes, provides the information needed to enter the service area. By way of example, the property list for a Chat room node (which is one type of leaf node) will typically include user-readable information about the Chat room, and will include the information needed by the Explorer to launch the Chat client application and add the user to the Chat room.

The Directory Service operates generally as follows. In response to requests from the client (which, in the preferred embodiment, is the Explorer), the Directory Service sends node properties over the WAN 106 to the client microcomputer 102, allowing the client to reconstruct user-selected portions of the content tree 220 (as shown in FIG. 3 for the Explorer) on the user's screen, and/or allowing the client to display node properties (such as the GoWord for the node) to the end user. To avoid unnecessary transfers of information over the WAN 106, the Directory Service advantageously returns only those properties that are specifically requested by the client.

Assuming that the Explorer is used as the client, when the user double clicks on a folder node (i.e., the icon for the folder node) from the right pane 304, or expands a node in the left pane 302, the Explorer uses a GetChildren API to generate a request to the Directory Service for the children of the folder node, specifying as parameters of the API the DEID of the folder node plus the names of the specific properties needed to display the children of the folder node. (The specific properties requested by the Explorer with such GetChildren calls are hard coded into the Explorer. In a preferred embodiment, the requested properties are the DEID, APPID, Name, Flags, Icon ID, Service Group ID, and the user's Access Rights.)

Various user actions cause the Explorer to generate requests for different node properties. For example, from the Explorer, a user can select a node and then select the "properties" command; this causes the Explorer to open the "properties" dialog box, which allows the user to select a "properties sheet" which lists the properties to be retrieved by the Explorer. The user may then specify, for example, "general" properties sheet which includes the "Rating" and "Pricing" properties of the node, causing the Explorer to generate a request for these properties. The TreeNav methods used by the Explorer for requesting properties and other information from the Directory Service are described below.

When the user double clicks on a leaf node from the Explorer, the Explorer initiates a service session with the corresponding service. To initiate the service session, the Explorer initially uses the APPID of the leaf node to identify the service application to be invoked. Once the identity of the appropriate executable file has been determined, the Explorer launches the client application for the service, and passes to the client application the DEID and the service group ID of the node. The client application then performs the appropriate service-related action. For example, if the node is a Chat room, the Chat client application uses the node's DEID to connect to the corresponding Chat room.

Before "showing" a node to the end user (by returning the requested properties of the node to the client), the Directory Service uses a GetAccountRights API to determine the access rights of the user with respect to the node to thereby determine whether the user is authorized to access the node. This access rights information is stored within the access rights database 152 on each security server 150. If the user is not authorized to access the node, the Directory Service does not return the properties of the node, and the node is not displayed to the user. By way of example, suppose that a user double clicks on the icon corresponding to node 1 in FIG. 2. This causes the Explorer to generate a GetChildren call to the Directory Service to obtain the children (i.e., enumerated properties of the children) of node 1. As parameters of the GetChildren request, the Explorer specifies the DEID of node 1, and specifies the properties (normally the Name, DEID, APPID, Service Group ID, Flags, Icon ID and Access Rights) to be returned for each child node. If, for example, the user is authorized to access node 4, but is not authorized to access node 5, the Directory Service will return only the properties of node 4. Thus, no properties of node 5 will be downloaded to the Explorer, and node 5 will not appear in the Explorer window on the user's screen.

To determine the user's access rights with respect to the node, the Directory Service initially reads the 32-bit Security Token associated with the node (which, as described above, is stored as a node property). The Directory Service then generates a GetAccountRights call, specifying as parameters of the call the node's Security Token and the user's 32-bit account number. The GetAccountRights API returns either a 16-bit access rights value which indicates the user's-access rights with respect to the node, or else returns a code indicating that the user is not authorized to access the node. The GetAccountRights API includes code which generates queries to the access rights databases 152 to obtain user-specific access rights lists, and also includes code which implements an access rights cache for locally storing these user-specific lists. The GetAccountRights API is further described below.

With the exception of the Access Rights property, which is a special case, all of the above-listed generic properties are "local properties," meaning that they are stored (or generated on-the-fly) locally (i.e., on the same application server 120) by the Directory Service Provider which stores the node. In accordance with one aspect of the present invention, a node may also have one or more "remote properties," which are properties that are stored or generated by the service (such as Chat) with which the node is associated (as indicated by the node's APPID). When a remote property is requested by the client, the Directory Service Provider retrieves the remote property (via a remote procedure call, or "RPC") from the associated service (which is normally implemented on a separate application server 120), and then returns the remote property to the client. To increase performance, the Directory Service also implements a remote properties cache (described below) for locally caching recently-retrieved remote properties. As described below under the heading "JUNCTION POINTS", the Name and Security Token properties of a junction point node are always stored remotely by the Directory Service Provider that stores the corresponding target node.

The provision for the retrieval of remote properties advantageously allows certain types of information to be stored or generated by the end services (such as Chat or Mediaview), rather than by the Directory Service Providers. This is particularly useful for information that changes dynamically. One example of a node property which may advantageously be stored remotely is a "Current Occupants" property of a Chat room, which indicates the current number of participants in the corresponding Chat conference. Because the Current Occupants property changes frequently, it would be inefficient to store this property with the node; doing so would require frequent update transactions over the LAN 122.

In accordance with one aspect of the present invention, a mechanism is provided which allows Directory Service Providers to maintain respective databases of data entities that are shared by multiple nodes. These shared data entities are referred herein as shared blocks of bytes, or "shabbies." In the presently preferred embodiment, four types of data entities are stored as shabbies: icon bitmaps, download-and-run files, sound files, and banner objects. As illustrated in FIG. 2 for one preferred embodiment, only the Dirsrv service implements a shabby database 222. Each shabby within the database 222 is specified by a unique 32-bit shabby ID ("SHID").

The ability for a Directory Service Provider to maintain a database of shabbies separate from the nodes of the Directory Service Provider is provided through special TreeNav and TreeEdit methods that may be used to create, delete, modify and download shabbies, and by the provision of certain node properties (such as the "Icon ID" property) that allow specific shabbies to be referenced by nodes. Because shabbies are stored separately from the node properties, there is no need to store multiple copies of each shabby, even though multiple nodes may share the same shabby. By way of example, suppose that the same icon is used for all Chat rooms, and that 30 Chat room objects currently exist within the Dirsrv namespace 212. Rather than storing 30 copies of the bitmap for the Chat room icon, the Dirsrv service stores the bitmap as a shabby (within the Dirsrv shabby database 222), and stores the shabby ID of the bitmap as the Icon ID property each Chat room node. The preferred methods by which shabbies are stored by Directory Service Providers—and downloaded to client computers 102 are described below under the heading "SHABBIES."

3. Client-Server Architecture of Directory Service (FIG. 4)

Figure 4:
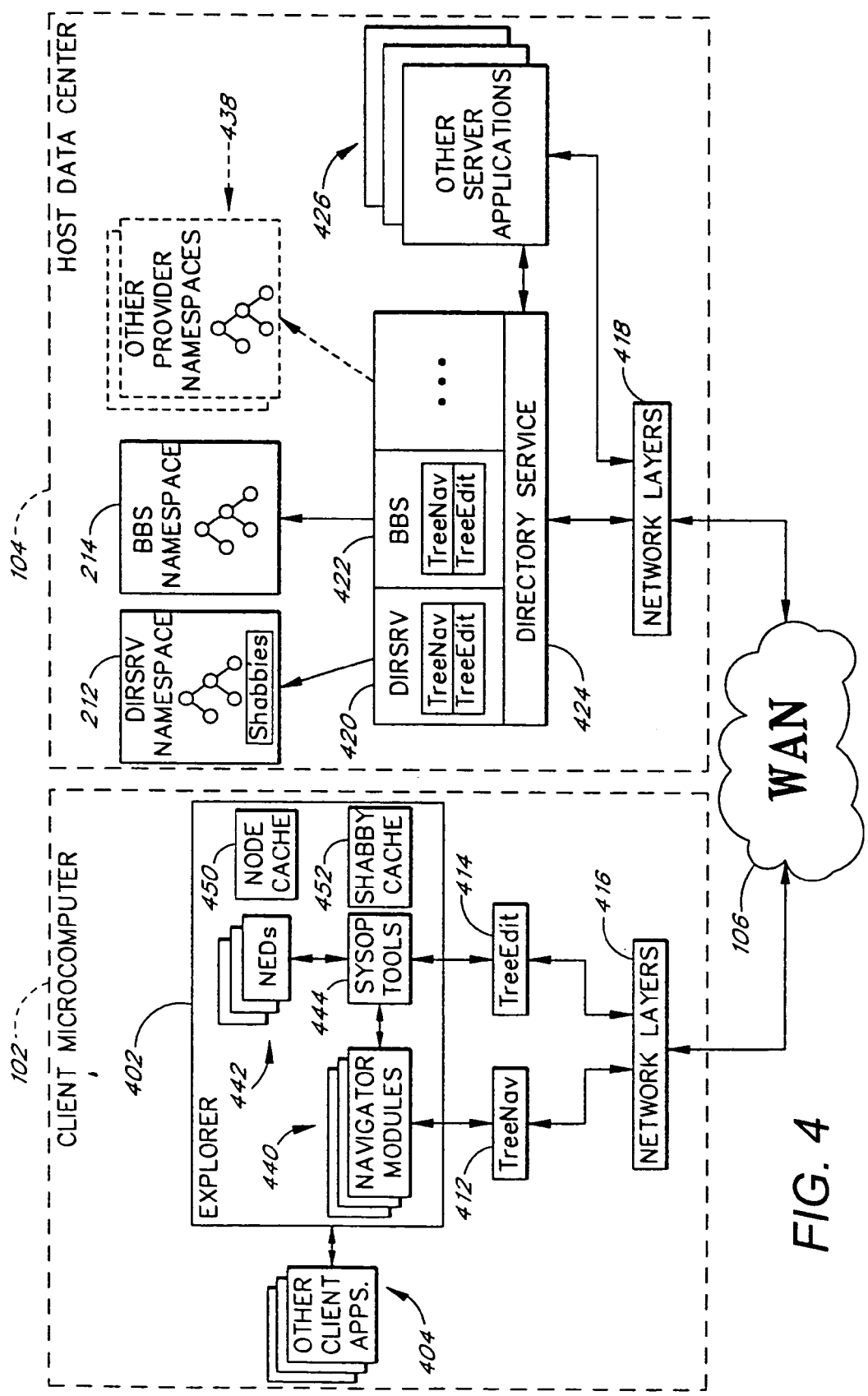
FIG. 4 illustrates the primary client and server components that may be invoked as a user browses the content of the network, via a preferred embodiment of a directory service.

FIG. 4 illustrates the primary client and server software components which may be invoked when a user uses the Explorer client application 402 to explore and/or edit content tree 220, and also illustrates the primary data entities accessed by these software components.

The client components include the Explorer client application 402, a variety of other client applications 404 (such as the client applications for the Chat, BBS and Mediaview services), the TreeNav API 412, the TreeEdit API 414 (which, as discussed below, may be omitted in embodiments which do not allow remote editing of the content tree 220), and network layers 416. The server components include network layers 418, the Dirsrv and BBS server applications 420, 422 (which are both Directory Service Providers, and which together form the Directory Service 424), and various other server applications 426 (such as the Chat and Mediaview service applications). The Directory Service 424 accesses the Dirsrv and BBS namespaces 212, 214, and may access additional provider namespaces 438 that correspond to other Directory Service Providers (represented by the ellipsis in FIG. 4).

The Explorer 402 includes multiple navigator modules 440 for navigating the content tree 220. Each navigator module 440 corresponds to and is used to navigate a respective provider namespace 212, 214, 438. Thus, for example, a Dirsrv navigator module is provided to navigate the Dirsrv namespace 212, and a BBS navigator module is provided to navigate the BBS namespace 214. Each navigator module 440 is preferably implemented as a dynamic link library (DLL) which is invoked by the Explorer 402 when the user enters into the corresponding provider namespace 212, 214, 438. With reference to FIG. 2, for example, when the user double clicks on the icon for junction point node 8, the Explorer 402 launches the BBS navigator to allow the user to navigate the BBS directory structure 204.

With further reference to FIG. 4, the navigator modules 440 use the TreeNav API 412 to navigate the content tree 220. The TreeNav API 412 provides all of the functionality for navigating and extracting information from the Directory Service Providers 420, 422, and includes the following methods:

GetProperties. Retrieves specific properties of a list of known nodes. The properties to be retrieved and the list of nodes are specified as parameters of the method.

GetParents. Retrieves specific properties of the parents of a known node. The properties to be retrieved and the identity (DEID) of the known node are specified as parameters of the method.

GetChildren. Retrieves specific properties of the children of a known node. The properties to be retrieved and the identity (DEID) of the known node are specified as parameters of the method.

GetDeidFromGoWord. Retrieves the DEID of the node that has the specified GoWord.

GetShabby. Gets a specific shabby given its shabby ID (SHID).

EnumShn. ("Enumerate shabby number"). Returns a listing of all shabby numbers given a shabby kind.

The TreeNav methods are further described below under the heading TREENAV METHODS.

With further reference to FIG. 4, the Explorer 402 also includes an optional Sysop tools client application 444, which may be invoked as part of the Explorer when a user has sysop-level privileges at a given node. The Sysop tools client application 444 generates calls to the client side of the TreeEdit API 414. The TreeEdit API 414 provides the functionality for modifying the content maintained by the Directory Service Providers, and consists of the following methods:

AddNode. Adds a node to the content tree 220.

DeleteNode. Deletes a node from the content tree 220.

SetProperties. Adds, deletes and/or modifies the properties of a node. Properties are deleted by specifying a property type of "sptNil" (Table 2 below) and a property size-of zero.

GetStatus. Returns the current status of a transaction.

Lock. Locks a provider namespace, to thereby prevent TreeEdit operations by anyone other than the locker.

Unlock. Unlocks a locked provider namespace.

LinkNode. Links two nodes, making one the child of the other.

UnlinkNode. Unlinks two nodes, provided that an orphan node does not result.

AddShabby. Adds a shabby.

DeleteShabby. Deletes a specified shabby.

ChangeShabby. Modifies an existing shabby.

OrderChildren. Sets the order of the children of a specified node.

As described above, the capability of a given user to edit the content tree 220 using the TreeEdit methods depends upon the particular access rights of the user, which are specified within the access rights database 152. These access rights are determined by the Directory Service Providers by generating GetAccountRights calls, and are passed across the network (via the TreeNav methods) to the Explorer 402. If, for example, a user has sysop-level privileges at a given node, the Sysop Tools client application 444 will display the node edit menu items (within the Explorer window) to the user, allowing the user to invoke certain of the TreeEdit methods to edit the properties of the node.

Each Directory Service Provider 420, 422 supports at least a subset of the TreeNav and TreeEdit methods, depending upon the level of Directory Service functionality provided. In the preferred implementation, the Dirsrv service supports all of the TreeNav and TreeEdit methods, and the BBS service supports all TreeNav and TreeEdit methods except for the shabby and Goword methods. (The BBS service thus does not support GoWord searches, and does not support the use of shabbies). Calls to methods that are not supported by a Directory Service Provider return an error code.

Advantageously, the TreeNav and TreeEdit interfaces provide an extensible framework for the addition of new Directory Service Providers. To add a Directory Service Provider, a server application is added which supports at least a subset of the TreeNav and TreeEdit APIs, and a corresponding navigator module 440 is added on the client side which generates TreeNav calls to the new server application. Once a basic set of folder nodes has been created within the provider namespace of the newly-added Directory Service Provider, junction points can be added to the new provider namespace (and to other provider namespaces) to create links to existing Directory Service Providers.

As will be apparent from the foregoing, each Directory Service Provider adheres in whole or in part to a "Directory Service standard" which essentially ties together the various Directory Service Providers to form a single, integrated DS. This standard is generally defined by (1) the methods of the TreeNav and TreeEdit APIs, (2) the three types of nodes (and their corresponding definitions) which may be stored by Directory Service Providers, and (3) the predefined properties (both optional and mandatory) which are stored by the Directory Service Providers. Although every Directory Service Provider must follow this standard at least in-part, various aspects of the Directory Service Providers are left open to developers. For example, the DS standard does not require any specific database implementation for the storage of nodes, and does not limit the types of properties which may be stored by the Directory Service Providers.

With further reference to FIG. 4, the Explorer 402 also includes multiple node editors (NEDs) 442. Each node editor 442 corresponds to a respective service on the network 100, and specifies a set of node properties that may be entered (by sysops) for nodes that correspond to that service. For example, a node editor 442 for the Chat service specifies the properties which may be entered for Chat room nodes (which are one type of leaf node), and a node editor for the Dirsrv service specifies the properties that may be entered for Dirsrv nodes (which are the folder nodes within the Dirsrv namespace).

Each node editor 442 is preferably in the form of a separate dynamic link library. When a new service is added to the network 100, a corresponding node editor 442 is simply downloaded to the client microcomputer 102 to allow sysops to create and edit Directory Service nodes for the new service.

The node editors 442 advantageously provide a mechanism for allowing the properties of Directory Service nodes to be customized on a per-service basis, and allow service-specific properties to be defined for nodes. When, for example, a new node is remotely created (or edited) by a sysop, the corresponding node editor 442 is invoked to provide a property sheet of the properties that can be set by sysops. (Certain properties, such as the DEID, APPID, and service group ID are set automatically, and cannot be modified by regular sysops). The sysop can then specify or modify these properties via a user interface of the Sysop Tools client application 444. The specific properties which may be modified by the user depend upon the sysop level (e.g., regular sysop, sysop manager, supersysop, etc.) of the user at the node.

As will be recognized from the forgoing, the Sysop Tools client application 444 and the TreeEdit API 414 are provided for the purpose of allowing sysops to remotely edit the content tree, and are not invoked unless the user has sysop privileges. Accordingly, these components may optionally be omitted in copies of the Explorer 402 code that are provided to regular (non-sysop) users.

A preferred implementation of the Sysop Tools client application 444, the TreeEdit API 414 and the node editors 442 is described in the above-referenced application of the title SYSTEM AND METHOD FOR EDITING CONTENT IN AN ON-LINE NETWORK.

With further reference to FIG. 4, the Explorer 402 also includes code for implementing a non-persistent node cache 450. During each logon session the Explorer 402 stores node properties that are returned by the Directory Service in the node cache 450. Before requesting the properties of a node, the Explorer 402 checks the node cache 450 to see if the properties have already been returned. Unnecessary transfers of property data are thereby avoided. At the end of each logon session, the node cache 450 is flushed, so that the reconstructed content tree 220 seen by the user upon the following logon session will reflect any changes that are made to the content tree 220.

The Explorer 402 also maintains a shabby cache 452 for storing certain types of shabbies that are returned by the Directory Service 424. In the preferred embodiment, the Explorer 402 stores icon bitmaps, sound files and banner objects within the shabby cache 452. The shabby cache 452 is preferably implemented on the hard disk of the user's microcomputer 102 as a persistent cache.

When the Directory Service 424 needs a shabby (such as an icon bitmap) for a node, the Explorer 402 initially requests the corresponding property (e.g., Icon ID, Soundfile ID, or Banner ID) of the node from the Directory Service, or, if the property has already been returned, reads the property from the node cache 450. Once the property (i.e., shabby ID) has been obtained, the Explorer 402 checks the shabby cache 452 for the corresponding shabby. If the shabby is not present in the shabby cache 452, the Explorer 402 generates a Get-Shabby call to the Directory Service Provider of the node (assuming the Directory Service Provider supports shabbies), specifying the shabby ID as a parameter of the GetShabby API. (As described below, download-and-run file shabbies are preferably returned using the FTM service, rather than the GetShabby API.)

In the preferred embodiment, each time the Directory Service 424 returns a shabby that is an icon bitmap, sound file or banner object, the shabby is stored in the shabby cache 452 in association with its shabby ID (SHID). Because these shabbies are stored in the cache 452 in association with their shabby IDs, rather than in association with the nodes to which they correspond, duplicate copies of shabbies within the shabby cache 452 are avoided.

Advantageously, the contents of the shabby cache 452 are not flushed between logon sessions. Thus, once an icon bitmap, sound file, or banner object has been returned by the Directory Service, it need not be re-transferred over the WAN 106 on subsequent logon sessions. Duplicate transfers of these kinds of shabbies are thereby avoided. To avoid large volumes of shabby data on the user's hard disk, a conventional least-recently-used (LRU) algorithm or similar algorithm may be used to delete from the shabby cache 452 any shabbies that have not recently been read from the cache 452.

4. Representation of Node Properties (FIG. 5)

Figure 5:
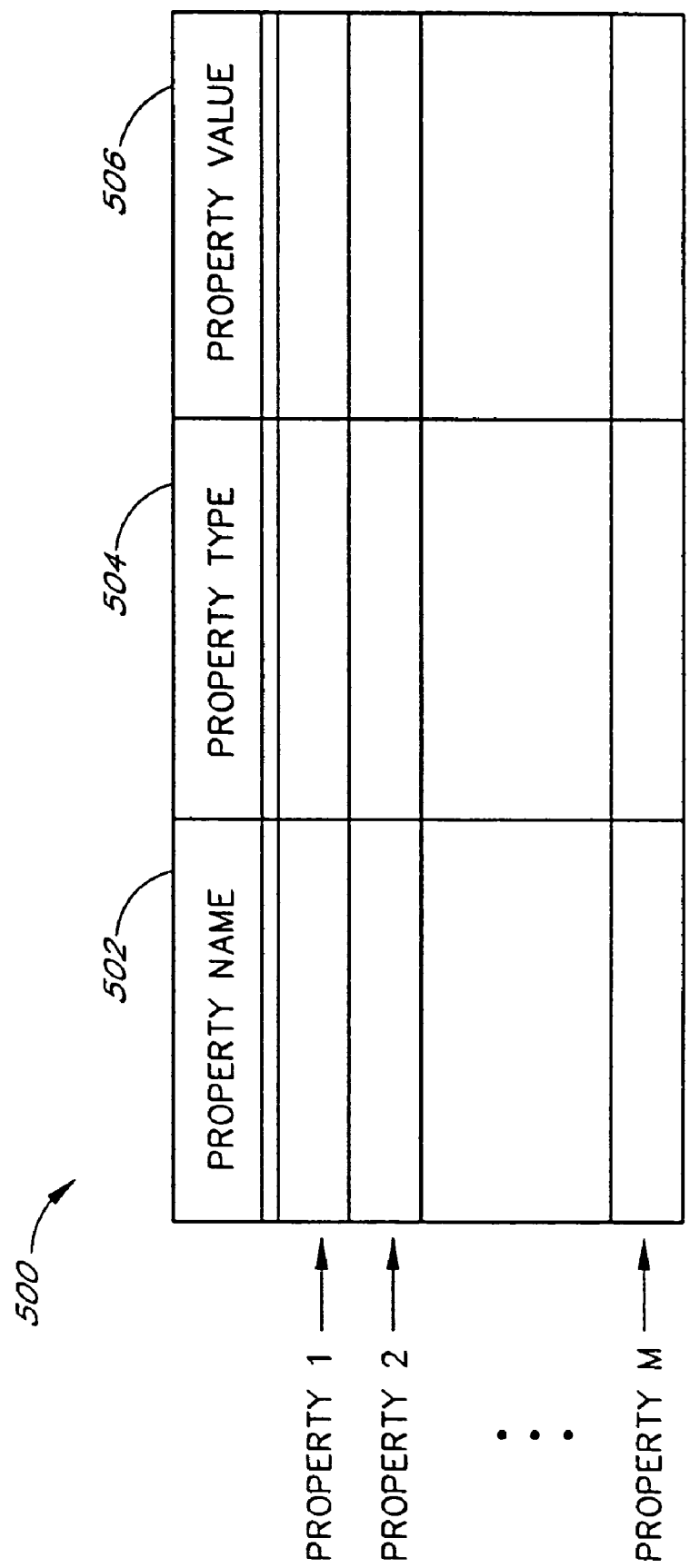
FIG. 5 illustrates a node table which represents the basic properties information associated with each node of the directory structures of FIG. 2.

With reference to FIG. 5, each node of the content tree 220 can be viewed as a table 500 of node properties to which the Directory Service provides access. This table 500 includes at least a subset of the above-listed generic properties (which includes the DEID, APPID Service Group ID, Flag, Security Token and Name of the node), and may also include one or more service-specific properties (such as a "maximum length of conversation" property for a Chat room).

At least some of the properties in the table 500 are local properties that are stored (or for some properties, generated on-the-fly) locally by the Directory Service Provider that provides access to the node. In the preferred embodiment, node files are used to store the local properties. The table 500 may also include one or more remote properties (which may be either generic or service-specific in nature) that are stored or generated on-the-fly by a separate (or "remote") service. This separate service is the service to which the node corresponds (such as Chat, BBS, Dirsrv or Mediaview), as indicated by the node's APPID.

Each node property, whether local or remote, has a property name 502, a property type 504, and a property value 506. Each property name 502 is preferably in the form of a null-terminated sequence of bytes which uniquely identifies a corresponding property. Property names 502 are passed over the WAN 106 whenever a TreeNav or TreeEdit API call requires the identification of one or more properties. To maintain high performance over the WAN 106, the most commonly requested properties are provided with very short names (typically 2 or 3 bytes long, including the terminating null). For example, the DEID, Flags, and APPID properties have null-terminated string names of "a", "b", and "c", respectively. (Longer, mnemonic names such as "szPropDeid," "szPropFlags," and "szPropAppid" are used by programmers to identify the properties, and these mnemonic names are converted into the actual property names 502 by the compiler.) The "type" 504 of a property identifies the data format (e.g., byte, word, doubleword, character string, etc.) of the corresponding property value 506. Properties can have any of the types listed in Table 2.

TABLE 2

| TYPE (MNEMONIC NAME) | NUMERIC IDENTIFIER | DESCRIPTION |
| --- | --- | --- |
| sptNil | 00H | invalid |
| sptByte | 01H | unsigned byte |
| sptWord | 02H | unsigned word |
| sptDword | 03H | unsigned doubleword |
| sptQword | 04H | unsigned quadword |
| sptSbyte | 05H | signed byte |
| sptSWord | 06H | signed word |
| sptSDword | 07H | signed doubleword |
| sptSQword | 08H | signed quadword |
| sptDeid | 09H | 64-bit directory entry ID |
| sptStr | 0AH | null-terminated string |
| sptUni | 0BH | unicode string |
| sptTime | 0CH | Win 32 filetime |
| sptPricing | 0DH | 32-bit pricing indicator |
| sptBinary | 0EH | block of bytes (raw data) |
| sptShid | 0FH | shabby ID (32 bits) |
| sptLocales | 10H | languages/regions |
| sptHacct | 11H | 32-bit user account no. |

The characters "spt" which are prepended to the mnemonic names in Table 2 stand for "service property type." With reference to Table 2, the sptTime type indicates that the value is in the Win32 "filetime" format, which is a well-known data format for representing time under the Microsoft Win32 API. The sptPricing type indicates a special 32-bit pricing format which consists of an 8-bit value that indicates a currency (such as U.S. dollars or Belgian francs), plus a 24-bit value that specifies an amount in the indicated currency.

With further reference to Table 2, the sptUni type indicates that the value is in unicode. Unicode is a standard 16-bit character set, developed by the Unicode Consortium, which includes the alphabetic characters of a variety of different languages. In the preferred embodiment, all string properties (including those of type sptStr) are stored by the Directory Service in Unicode, and are converted by the TreeNav methods on the client computers 102 to the appropriate character sets for individual users.

As shown in Table 2, each property type is identified by a respective 8-bit identifier. These numeric identifiers are used internally (e.g., within the node files). to represent the corresponding property types. As with the mnemonic names for the node properties the mnemonic names listed in Table 2 are used by programmers for writing code.

The property types for the generic properties described above are listed in Table 3.

TABLE 3

| PROPERTY | TYPE |
| --- | --- |
| Name | sptUni |
| DEID | sptLInt |
| APPID | sptDword |
| Service Group ID | sptWord |
| Icon ID | sptShid |
| Flags | sptByte |
| Security Token | sptDword |
| Description | sptStr |
| GoWord | sptStr |
| Search Keywords | sptStr |
| Owner | sptDword |
| Sysops | sptStr |
| Pricing | sptPricing |
| Rating | sptDword |
| Run Info | sptStr |
| Locales | sptLocales |
| Junction | sptDeid |

TABLE 3-continued

| PROPERTY | TYPE |
| --- | --- |
| Parents | sptDword |
| Children | sptDword |
| Access Rights | sptWord |
| Soundfile ID | sptShid |
| Banner ID | sptShid |
| Drfile ID | sptShid |

With further reference to FIG. 5, the property value 506 represents the actual data or information stored by the property. For example, for the property "Name", the value is the null-terminated character string (in unicode) of the name of the node, and for the property DEID, the property value is the 64-bit DEID of the node.

5. Node Disk Structures (FIG. 6)

Figure 6:
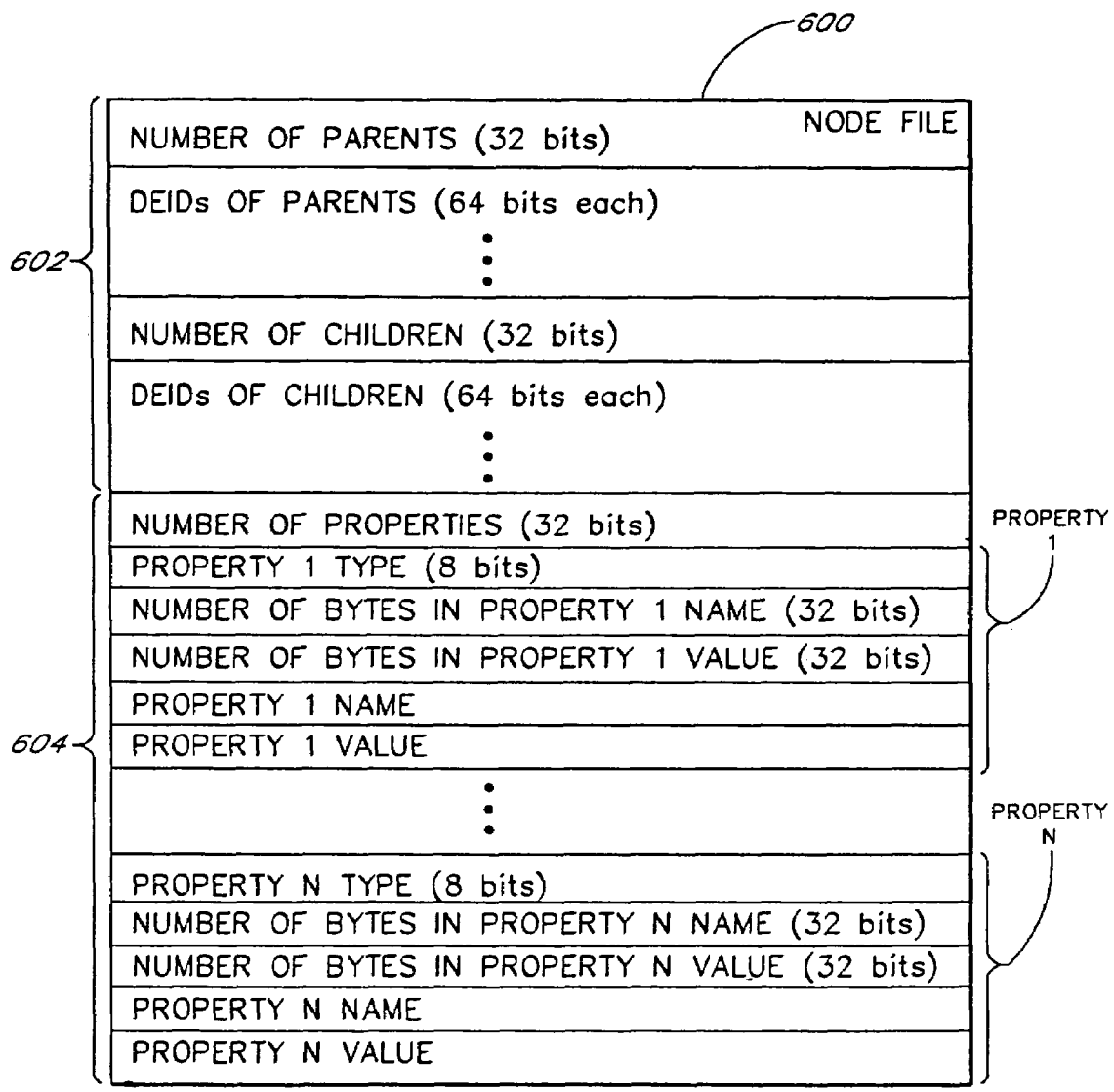
FIG. 6 illustrates a preferred format for a node file.

FIG. 6 illustrates a preferred file format which may be used by Directory Service Providers for the storage of nodes. The specific format shown in FIG. 6 is the format used by the Dirsrv service. As will be apparent to those skilled in the art, various alternative file formats and database arrangements are possible.

With reference to FIG. 6, each node file 600 contains a header portion 602 which identifies the parents and children of the node, followed a property list portion 604 which specifies the local properties of the node. The header portion 602 contains the number of parents of the node, followed by the DEIDs of the parents, followed by the number of children of the node, followed by the DEIDs of the children.

The property list portion 604 contains the number of properties in the list, followed by a listing of the names, types and values of the node's properties. Specifically, for each property stored within the node file 600, the property list portion 604 contains the property type (identified by the 8-bit type identifier), followed by the number of bytes in the property name, followed by the number of bytes in the property value, followed by the property name 502, followed by the property value.

In the preferred embodiment of the Dirsrv service, node files are named and stored according to the following convention:

filename=<DEID low part (hex)>, subdirectory=<DEID high part (hex)>.

Thus, for example, the node file 600 for a node having a 64-bit DEID of 00000000:000002A3 (hex) will have the filename 000002A3, and will be stored in the subdirectory 00000000. If this node is a Dirsrv node, the node file will be stored on all of the application servers 120 of the Dirsrv service group 132. As described below, the node files are preferably loaded from the hard disks of the application servers 120 into main memory when the Directory Service Providers are brought up on these servers 120.

Figure 7:
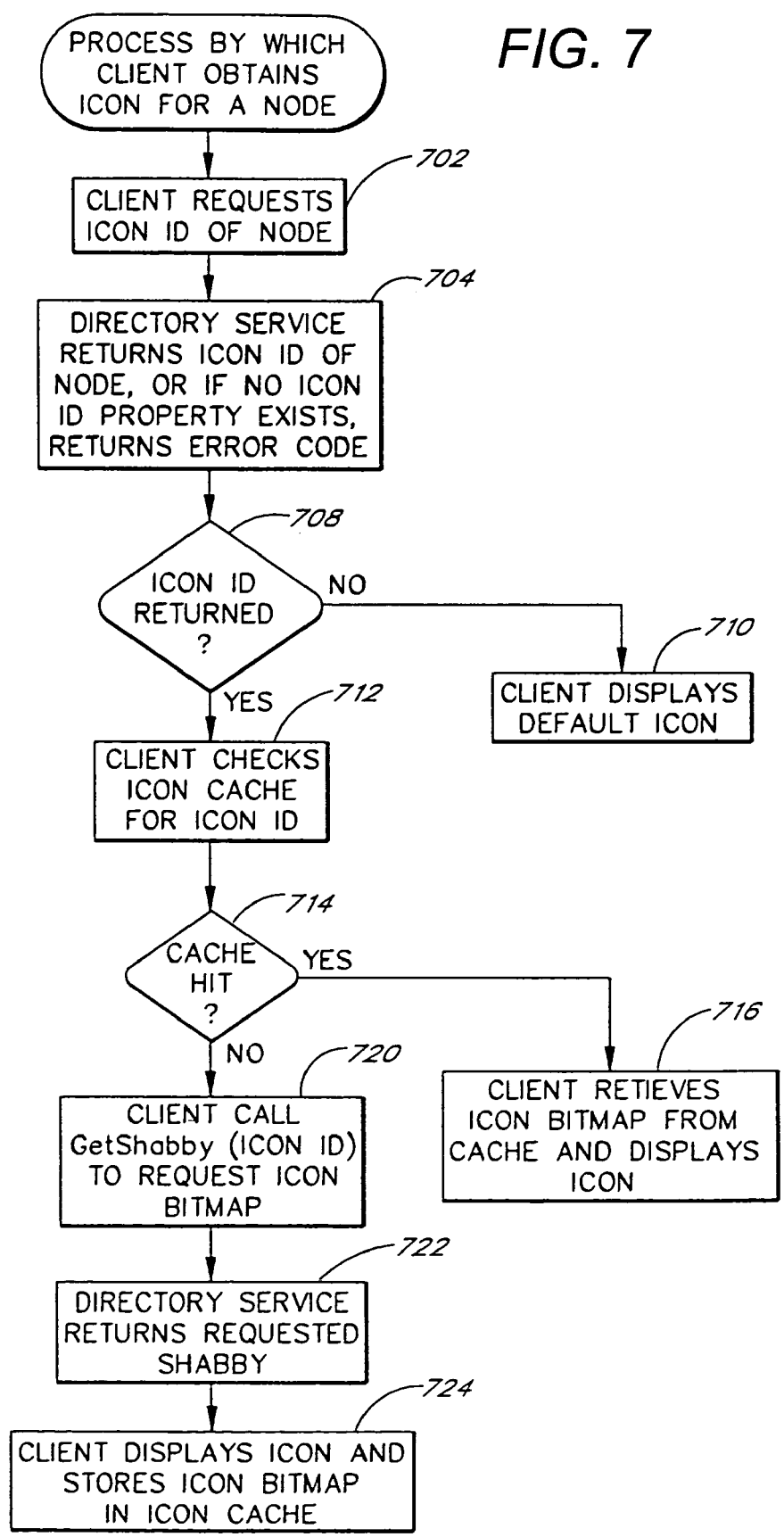
FIG. 7 illustrates a preferred process by which client applications request, download and cache icon bitmaps that are stored by the directory service of FIG. 4.

6. Shabbies (FIG. 7)

As indicated above, the present invention provides for the separate storage of data items that are shared by multiple nodes of the same provider namespace. The shared data items are stored by the Directory Service Providers as shabbies (preferably within individual shabby files), and are edited and downloaded using special methods of the TreeNav and TreeEdit APIs. A given Directory Service Provider may, but need not, support shabbies. (As indicated above the Dirsrv service supports shabbies, and the BBS service does not).

In the present implementation of the network 100, four general types of data items are stored as shabbies: icon bitmaps, banner objects, sound files, and download-and-run files. As will be recognized, however, various other types of shared data items may be stored as shabbies, including, for example, video files and multimedia files.

In the preferred embodiment, every shabby has associated with it two numeric identifiers:

SHK. (Shabby kind). This is an 8-bit number which identifies the type of the shabby, such as icon bitmap, banner bitmap, banner metafile, sound file, download-and-run file, etc. Shabby kinds are assigned as new media types are added.

SHN. (Shabby number). This is a 24-bit number which identifies a shabby within a kind, within a provider namespace.

The EnumShn method of the TreeNav API allows client applications to obtain a list of all SHNs within a given shabby kind. Thus, for example, to download all existing icons, the EnumShn method can be used by the client to obtain a list of the SHNs of the icons, and the GetShabby method can then be used to retrieve the icons.

The 32-bit number <SHK,SHN> is referred to as the shabby ID, or "SHID." Every shabby has a unique SHID within the shabby's provider namespace. To reference a shabby from a node, the SHID of the shabby is stored as an appropriate property of the node. In a present implementation, the properties that store SHIDs are the Icon ID, Banner ID, Soundfile ID and Drfile ID properties. (Note from Table 3 above that each of these four property types has a type of "sptShid.") For example, to specify a sound file for a node, the sysop would enter the SHID of the sound file as the Soundfile ID property of the node.

Shabbies can be divided into one of two groups, depending upon how they are retrieved by the client:

TreeNav-able shabbies. These shabbies are retrieved via the GetShabby method of the TreeNav API, which returns a shabby given its SHID. No security checking is performed by the Directory Service before returning TreeNav-able shabbies.

FTM-able shabbies. These shabbies can be retrieved only via the FTM (File Transfer Manager) service. The client retrieves these shabbies by specifying the DEID of the node, together with the name of the property (e.g., Icon ID, Banner ID, etc.) that contains the SHID of the shabby to be downloaded. User access to the node is verified before downloading the shabby to the client microcomputer 102. (In the preferred embodiment, download-and-run files are the only shabbies that are downloaded using FTM, and all others are downloaded using the TreeNav APIs).

The most significant bit of the SHK indicates whether the shabby is TreeNav-able or FTM-able.

In the preferred embodiment of the Dirsrv service, shabby files are named and stored according to the following convention:

filename=<00,SHN (hex)>, subdirectory=<000000,SHK (hex)>.

Thus, for example, a shabby with SHID=<SHK, SHN>=12345678 (hex) will be stored in a file having the name 00345678, and will be located in a subdirectory having the name 00000012. Each shabby file simply contains the actual bytes of the shabby; no headers or other information are contained within the shabby files.

FIG. 7 illustrates a preferred process by which a client application (such as the Explorer) obtains the bitmap for the icon of a node. With reference to block 702, the client application ("client") initially requests the Icon ID property of the node. This may be done, for example, using the GetChildren method or the GetProperties method of the TreeNav API. (The GetChildren and GetProperties methods are described below.) With reference to block 704, the Directory Service (i.e., a particular Directory Service Provider of the Directory Service) responds to the request by returning the Icon ID property (i.e., the Icon ID property value, which is in the form of a 32-bit SHID), or, if no Icon ID property exists for the node, returns an error code.

With reference to blocks 708 and 710, if an error code is returned by the Directory Service, the client displays a default icon. In the preferred embodiment, the client selects the default icon based upon the APPID of the node. Thus, for example, if the node is a BBS node (as indicated by the APPID), the client displays a generic BBS icon.

With reference to blocks 712-716, if an icon ID is returned by the Directory Service, the client uses the returned Icon ID to check its shabby cache 452 (or "icon cache" in FIG. 7) for the icon bitmap. If the bitmap if found in the shabby cache 452 (referred to as a "cache hit"), the client retrieves the bitmap from the cache 452 and displays the icon. For frequent users of the network, the cache hit rate may be very high (for example, 95% or higher), since the shabby cache 452 is implemented as a persistent (or "off-line") cache. In the preferred embodiment, this hit rate is improved by the use of the same icon for many different nodes.

With reference to blocks 720-724, if the icon bitmap is not present within the cache 452, the client generates a GetShabby call to retrieve the shabby identified by the icon ID. The Directory Service Provider responds by reading the requested shabby (i.e., icon bitmap) from its shabby database, and by sending the shabby over the WAN 106 to the client. The client then displays the icon, and stores the icon bitmap within the shabby cache 452. As described above, because icon bitmaps are not deleted from the shabby cache 452 in the preferred embodiment, there is no need for the client to download the same bitmap twice. In other embodiments, an LRU (least recently used) or other algorithm may be used to delete icon bitmaps from the user's hard disk, in which case the client may have to download the same bitmap more than once.

The FIG. 7 process of identifying, downloading and caching icon bitmaps is also applicable to other types of shabbies which may be cached by the client. As indicated above, the types of shabbies that are cached in a presently preferred implementation of the Explorer 402 are icon bitmaps, sound files, and banner objects.

7. Server Memory Structures and Operation (FIGS. 8 and 9)

Figure 8:
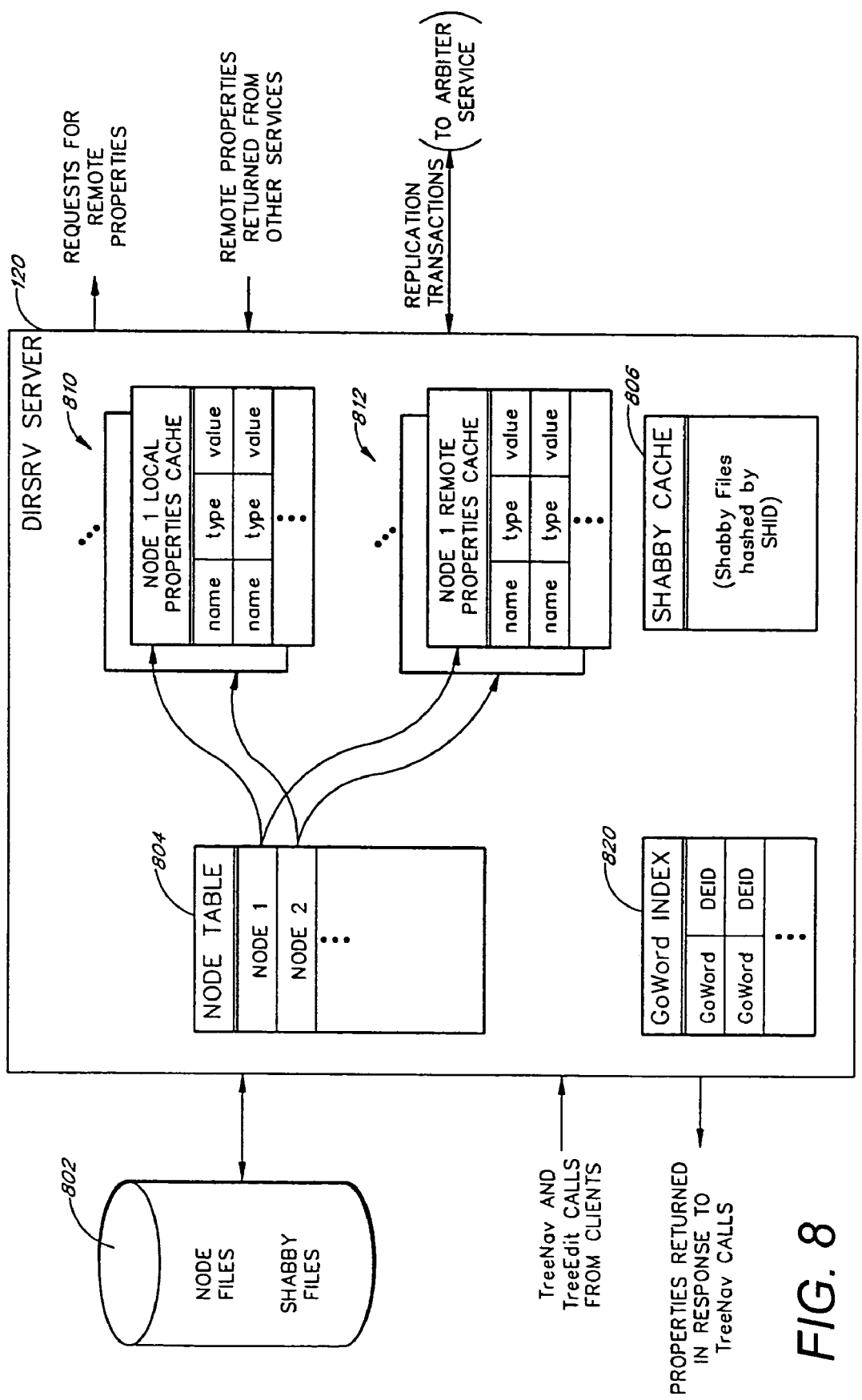
FIG. 8 illustrates the primary memory structures implemented on each application server of the Dirsrv service group of FIG. 1, and illustrates the basic calls generated and received by the application server.
Figure 9:
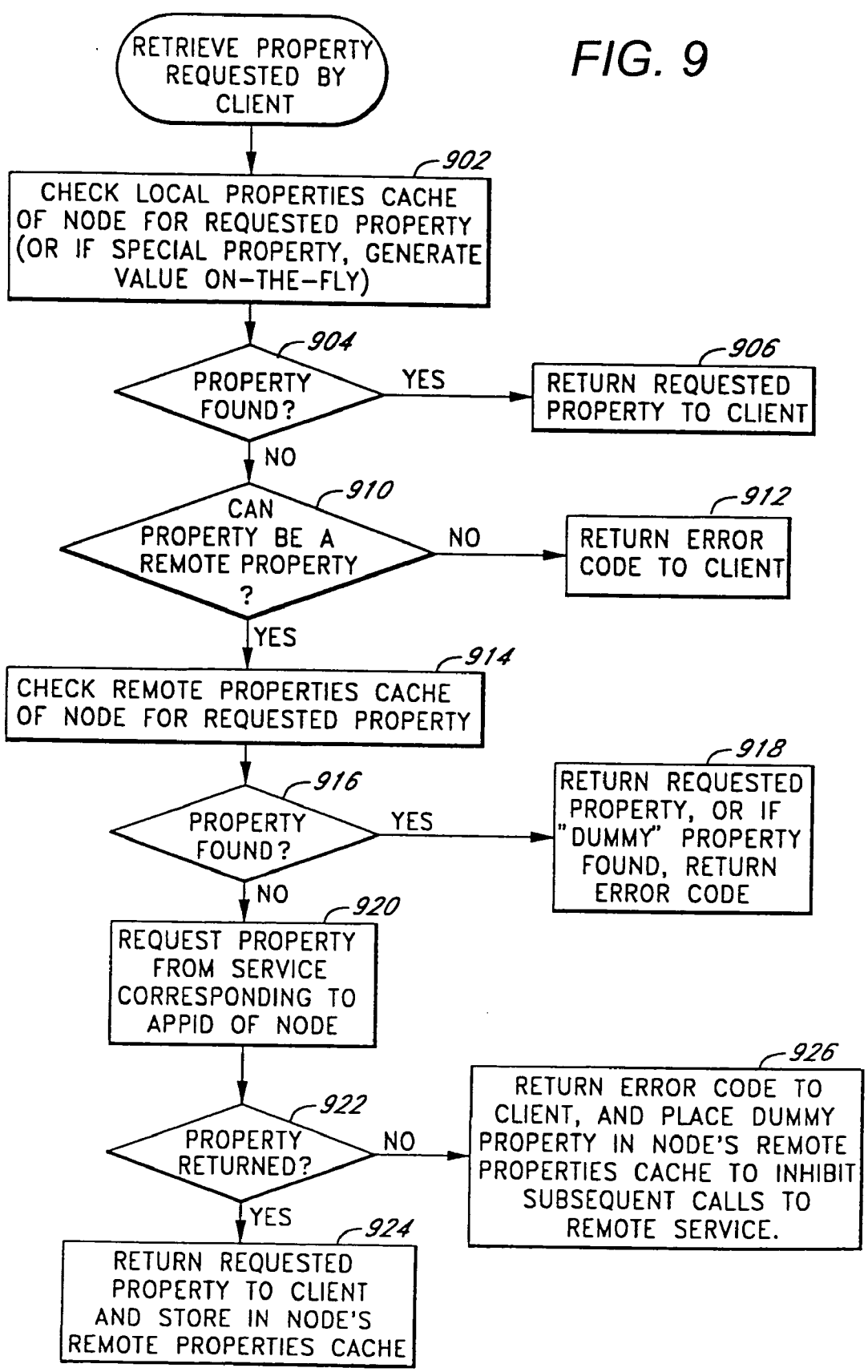
FIG. 9 illustrates a preferred process by which a directory service application server (such as the Dirsrv server of FIG. 8) retrieves and returns a specific-property requested by a client.

With reference to FIG. 8, each application server 120 ("Dirsrv server") of the Dirsrv service group 132 includes a respective hard disk 802 which stores all of the Dirsrv node files (representing all of the nodes within the Dirsrv namespace 212), and which stores all of the Dirsrv shabby files (representing all shabbies that are associated with Dirsrv nodes). To increase performance as node properties and shabbies are requested by clients, the node files and shabby files are maintained within the main memory of the Dirsrv server 120 (and all other application servers of the Dirsrv service group 132). The node files are stored as C++ objects within a node table 804, and are hashed by their respective DEIDs. The shabby files are stored within a shabby cache 806, and are hashed by their respective SHNs (shabby numbers). As is well known in the art, hashing algorithms reduce the amount of time required to locate a data item in memory, and thereby increase performance.

In the preferred embodiment, all of the nodes (i.e., node files) are loaded into memory when the Dirsrv service is initially brought up on the application server 120. Once a node is loaded into memory, it is not removed from memory unless deleted via a TreeEdit operation. In other embodiments, the nodes may be loaded and unloaded dynamically.

Shabby files are preferably loaded into memory upon request only (i.e., a shabby is not loaded until requested via a GetShabby call). As the shabbies are loaded into memory, the Dirsrv service generates a respective hash table (not shown) for each shabby kind (i.e., for each SHK value). Once a shabby is loaded into memory, it is not removed from memory unless deleted via a TreeEdit operation.

Each node (stored as a C++ object) in the node table 804 consists primarily of a local properties cache 810 and a remote properties cache 812. The local properties cache 810 contains the local properties of the respective node, and the remote properties cache 812 contains any remote properties that have recently been retrieved by the Dirsrv server 120. The remote property caches 812 are refreshed periodically (at a frequency that may be set via a global network registry, and with a default of every 5 minutes), to ensure that the cached remote property data is relatively up-to-date. Properties stored within the local and remote properties caches 810, 812 are preferably hashed by property name.

With further reference to FIG. 8, the Dirsrv service maintains a Goword index 820 for supporting GoWord searches. The GoWord index 820 maps GoWords to the DEIDs of the corresponding nodes, and is accessed whenever a GetDeidFromGoWord call is received by the server 120. In the preferred embodiment, the GoWord index 820 is generated on-the-fly as the node files are initially loaded into memory, and is updated as nodes are added, deleted and edited via the TreeEdit methods.

With reference to FIGS. 1 and 8, whenever one of the servers 120 of that Dirsrv service group 132 receives a TreeNav call the requires an update to a node file or a shabby file, that update transaction is forwarded to the Arbiter service, which is a generic (i.e., non-service-specific) transaction replication service that replicates update transactions across groups of application servers 120. In the preferred embodiment, a dedicated microcomputer (not shown) that runs the Arbiter service application is provided to handle all Dirsrv update transactions. The Arbiter service (running on the dedicated microcomputer) responds to the forwarded update transaction by broadcasting the transaction to all of the servers 120 of the Dirsrv service group 132 for processing. The Arbiter service also monitors the outcome of the update transaction on each application server 120 of the Dirsrv service group 132 to ensure consistent processing by the different servers. This process of replicating update transactions ensures that the node files and shabby files stored by the different servers 120 of the service group 132 are identical.

FIG. 9 illustrates the process by which the Dirsrv service (running on a particular application server 120) responds to a request from a client (such as the Explorer) for a particular property of a particular node. The request may result from either a GetProperties call or a GetChildren call. It may be assumed in FIG. 9 that the user's access rights to the node have already been verified. (The GetProperties and GetChildren methods, and the method by which user access rights are determined, are described in the following sections).

With reference to blocks 902-906, the Dirsrv server/service initially checks the node's local properties cache 810, and if the requested property is found, returns the property value to the client. (For certain properties, such as the "Parents," "Children" and "Access Rights" properties, the Dirsrv alternatively determines the property value on-the-fly.) With reference to block 910, if the requested property is not found in the local properties cache 810, the Dirsrv service compares the property name against a list of properties that are never stored remotely, to thereby determine whether the requested property may be stored remotely. In the preferred embodiment, this list consists of the following properties: DEID, APPID, Flags, Service Group ID, GoWord, Junction, Parents, Children, Access Rights, and all properties of type sptShid. If the requested name appears in the list (indicating that the property is not a. remote property), the Dirsrv service returns an error code (preferably in the form of an empty property) to the client to indicate that the property does not exist for the node.

With reference to blocks 914-918, if the requested property is one which may be stored remotely, the Dirsrv service checks the remote properties cache 812 for the property. If the property is found in the remote properties cache 812, and is not a dummy property (discussed below), the Dirsrv service returns the requested property to the client. If the property is found but is a dummy property, the Dirsrv service returns an error code to the client to indicate that the property does not exist for the node.

With reference to blocks 920-924, if the requested property is not found in either the local properties cache 810 or the remote properties cache 812 for the node, the Dirsrv service uses the node's APPID to determine the remote service with which the node is associated, and then forwards the property request (via an RPC) to this service. If the property is returned by the remote service, the Dirsrv service returns the property to the client and stores the property within the remote properties cache 812 for the node.

With reference to block 926, if the remote service fails to return the requested property, the Dirsrv service returns an error code to the client. Additionally, the Dirsrv service stores a dummy property (type sptNil, size zero) in the node's remote properties cache 812 to inhibit the forwarding of requests for the property to the remote service.

Although FIGS. 8 and 9 (and the associated description) are directed to the Dirsrv service, these Figures are also generally applicable to the application servers 120 of the BBS service group 134, with the exception that the BBS service does not implement either a GoWord index 820 or a shabby cache 806. Further, the implementation depicted by these figures is suitable for other Directory Service Providers (other than Dirsrv and BBS) that may be added to the Directory Service.

8. Junction Points (FIGS. 10A and 10B)

As described above, junction point nodes provide a seamless interface between different provider namespaces, and thereby provide support for multiple namespaces. In the preferred embodiment, junction points have the following characteristics:

1. A "junction point" bit of the Flags property is set, indicating that the node is a junction point.
2. The APPID property contains the APPID of the target provider namespace.
3. The "Junction" property (type sptDeid) contains the DEID of the target node. (All junction point nodes have this property).
4. The Name, Security Token and Locales properties are stored as remote properties by the target Directory Service Provider. Specifically, the Name, Security Token and Locales (if specified) of the target node are used, respectively, as the Name, Security Token and Locales of the junction point node. Thus, for example, when the Explorer requests the Name of a junction point node in the Dirsrv namespace that serves as a link to a BBS folder node, the Dirsrv service passes the request to the BBS service, and the BBS service returns the Name of the target BBS folder node.
5. Junction point nodes cannot have children.

Figure 10A:
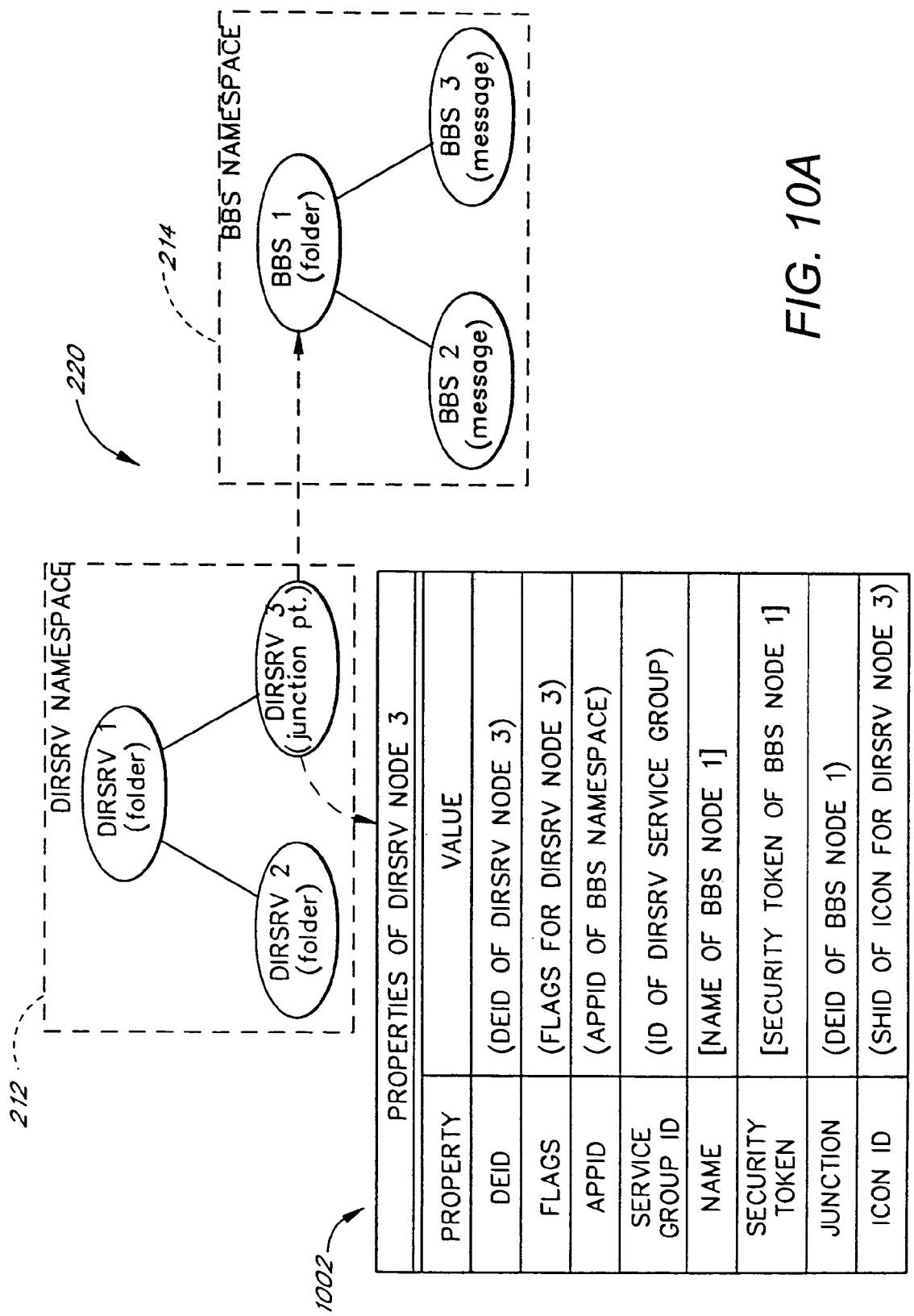
FIGS. 10A and 10B illustrate a preferred method for providing a seamless interface between directory namespaces through the use of junction points.
Figure 10B:
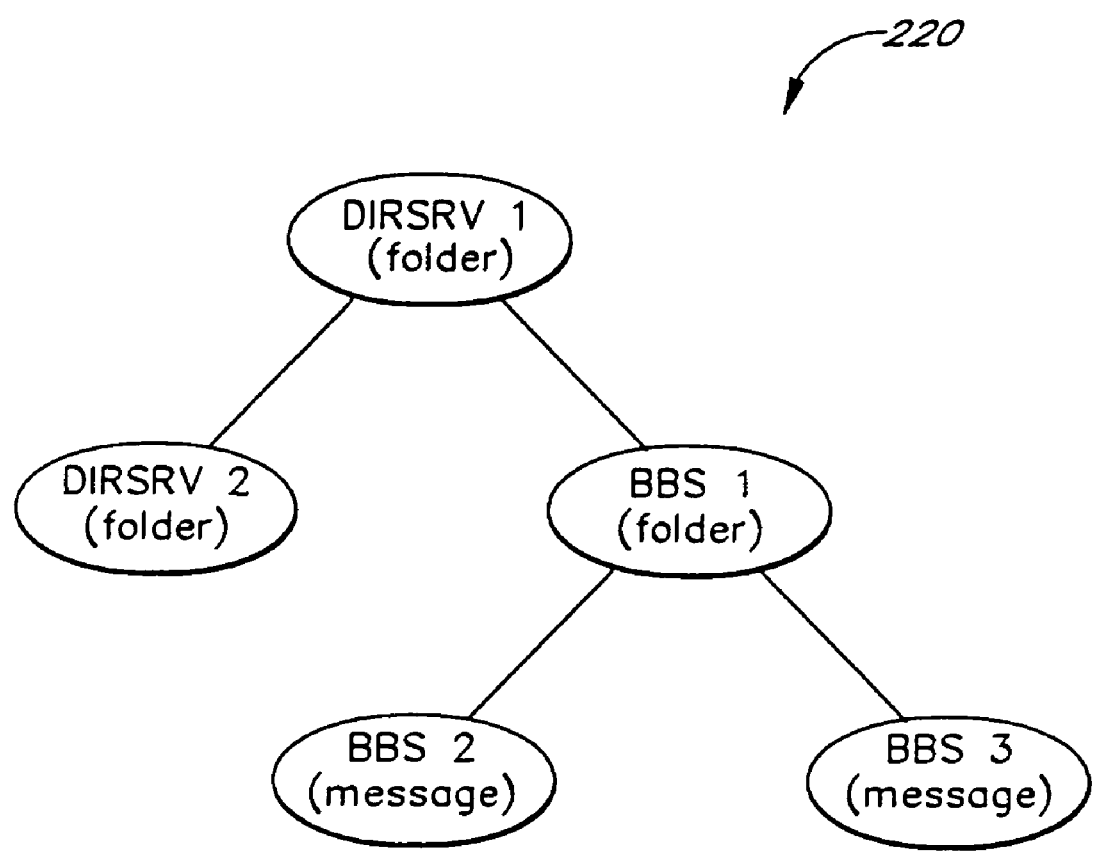

FIG. 10A illustrates the use of a junction point node to link the Dirsrv namespace 212 to the BBS namespace 214. In this example, the junction point node is "Dirsrv 3," and the target node is "BBS 1." The properties of Dirsrv 3 are shown in the properties table 1002. In the properties table 802, property values that are stored remotely (by the BBS service) are shown in brackets.

As illustrated in FIG. 10A, the Name and Security Token of Dirsrv 3 are actually the Name and Security token of the target node, BBS 1, and are stored remotely by the BBS service (as local properties of BBS 1). An optional Locales property (not shown) may also be stored remotely. The remaining properties of node Dirsrv 3 are stored locally by the Dirsrv service, preferably within a node file for Dirsrv 3. As with all other types of nodes, Dirsrv 3 includes a DEID, Flags, an APPID, and a Service Group ID. The APPID identifies the namespace of the target node. Because Dirsrv 3 is a junction point node, it also includes a "Junction" property, which contains the DEID of the target node. Dirsrv 3 may also include an Icon ID, which contains the DEID of the Icon that will be displayed by the Explorer.

FIG. 10B illustrates generally how the node configuration of FIG. 10A is seen by an end user via the Explorer (assuming the user is authorized to access every such node). As the user navigates the nodes of the Dirsrv namespace 212, the user sees the BBS 1 folder node as being a child of the Dirsrv 1 folder node, without any indication that the BBS 1 node resides in a separate namespace on a separate application server. When the user double clicks on the icon (not shown) for the BBS 1 node, the Explorer 402 launches the navigator 440 for the BBS service (using the APPID of Dirsrv 3, which identifies the appropriate navigator), allowing the user to view the BBS message nodes, BBS 2 and BBS 3. This process of launching the BBS navigator is advantageously transparent to the user.

In the presently preferred implementation, all junction points of the content tree 220 serve as proxies to BBS folders. Although junction points could also be provided within the BBS namespace 214, the need for such junction points is obviated by an Explorer feature which allows the user to move upward through the tree 220 along the same path taken to get to the current node. With reference to FIG. 10A, for example, if a user takes the path (Dirsrv 1)→(Dirsrv 3/BBS 1)→(BBS 3) to get to node BBS 3, the user can then move up the content tree 220 along the same path (using either a "parent folder" option or by clicking on portions of the map 304 within the left pane 302) to return to the level of Dirsrv 1.

9. TreeNav Methods

As described above, the TreeNav API provides the functionality needed by client applications (such as the Explorer) to extract directory information (properties, shabbies, etc.) from the various Directory Service Providers, As will be appreciated by those of ordinary skill in the art, the provision of the TreeNav API facilitates both the addition of new Directory Service Providers to the Directory Service and the addition of new client applications of the Directory Service.

Table 4 lists the parameters of the primary methods of the TreeNav API. The respective functions performed by these methods are described above under the heading OVERVIEW OF DIRECTORY SERVICE AND RELATED COMPONENTS. Table 5 indicates the information held by each of the parameters listed in Table 4.

TABLE 4

| TreeNav METHOD | PARAMETERS |
| --- | --- |
| GetProperties | pdeid, nDeid, rgszProp, pLocales, pnNodes, phDyn |
| GetChildren | deid, fIncludeMe, rgszProp, pLocales, pnNodes, phDyn |
| GetParents | deid, fIncludeMe, rgszProp, pLocales, pnNodes, phDyn |
| GetDeidFromGoWord | szGoWord, pLocales, pdeid |
| GetShabby | shid, ppv, pnSize |
| EnumShn | shk, pCount, phDyn |

TABLE 5

| PARAMETER | INFORMATION HELD BY PARAMETER |
| --- | --- |
| pdeid | Array of DEIDs |
| nDeid | Number of DEIDs in pdeid |
| rgszProp | Array of property names |
| pLocales | List of LCIDs for locales filtering (empty list indicates that nodes off all locales should be returned) |
| pnNodes | Placeholder for number of nodes to be returned |
| phDyn | Placeholder for handle to dynamic-sized buffer which is used to return information to client |
| deid | A single DEID of a node |
| fIncludeMe | Flag which indicates whether the node for which the DEID is being provided is to be included. |
| szGoword | Null-terminated GoWord |
| shid | A single Shabby ID |
| ppv | Placeholder for shabby buffer |
| pnSize | Placeholder for size - used to return size of shabby |
| shk | A single shabby kind |
| pCount | Placeholder for 16-bit value which indicates the number (count) of shabbies for which SHNs are being returned |

As described above, the methods of the TreeNav API are advantageously structured such that only those properties specifically requested by the client are returned by the Directory Service. Unnecessary transfers of property data over the WAN 106 are thereby avoided, and valuable bandwidth is conserved. WAN bandwidth is further conserved as a result of the access rights filtering and locales filtering features of the present invention, which are described below.

Figure 11:
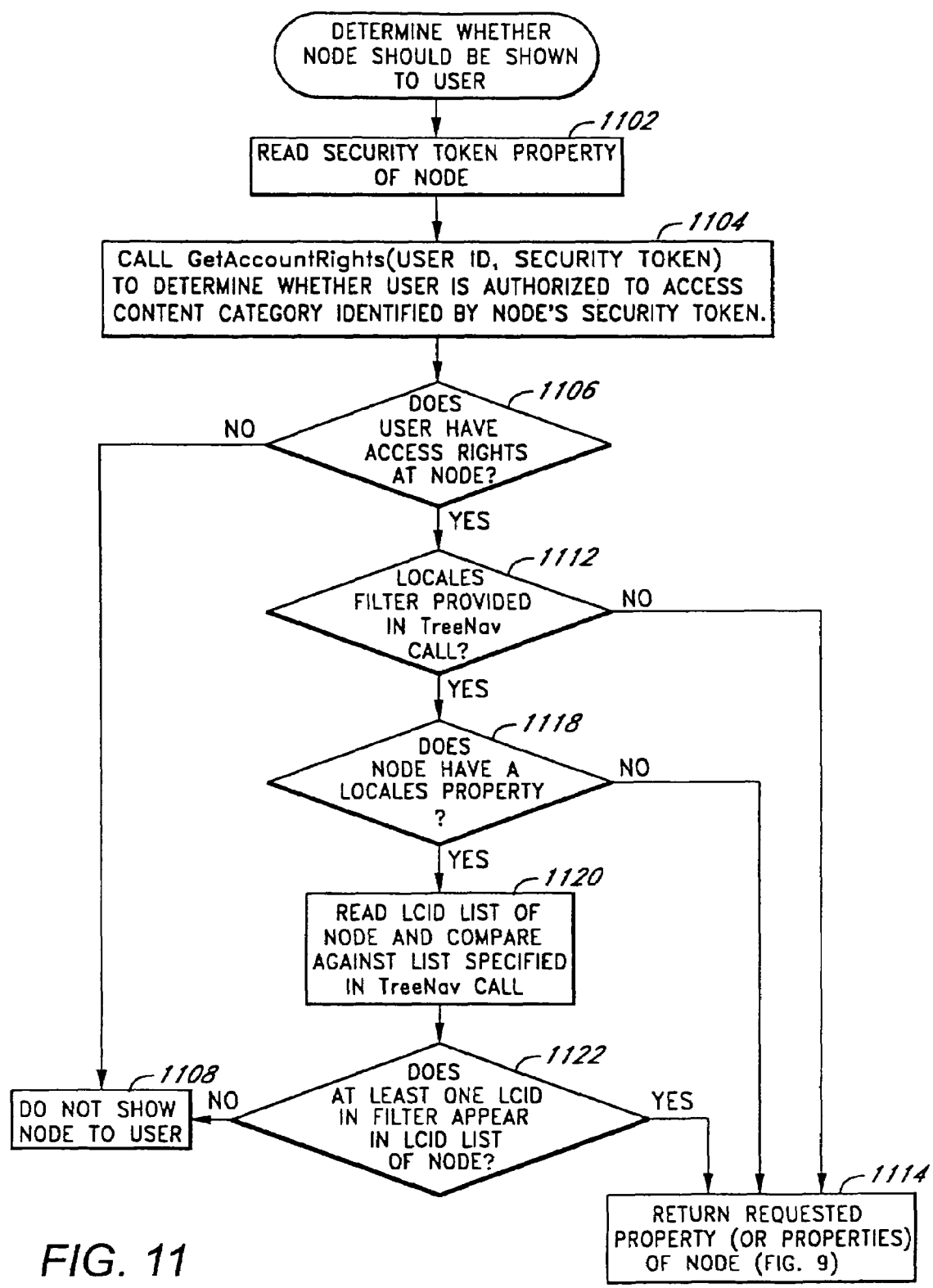
FIG. 11 illustrates a sequence of steps performed on a directory service application server to determine whether to show a node to a user.

10. Locales and Access Rights Filtering of Nodes (FIG. 11)

As indicated in Tables 4 and 5, the GetProperties, GetChildren, GetParents and GetDeidFromGoWord methods include a "pLocales" parameter, which allows the client to specify a locales filter to be applied on the server side. This locales filter is preferably in the form of a list of LCIDs (locales IDs), with each member of the list identifying a language and/or geographic region that the client is "interested in." In the preferred embodiment, the locales filters are specified by end users via a dialog box of the Explorer, through which users can select from a list of predefined locales. Users can also select an "all locales" option, in which case no locales-based filtering will be performed.

When a locales filter is provided by the client in a TreeNav call, the Directory Service excludes (i.e., does not return the requested properties of) any node that has a Locales property that does not include at least one of the locales specified in the filter. (Nodes that do not have a Locales property are not excluded). Thus, for example, if the client generates the call GetChildren(DEID=5, locales=spanish, french)

(other parameters omitted for convenience), the Directory Service will filter out any children of node DEID=5 that have Locales properties which do not include either spanish or french. When an empty list (i.e., a list with no LCID entries) is sent by the client, the Directory Service does not perform locales-based filtering.

Locales-based filtering provides at least two significant benefits. First, locales-based filtering allows the end user to view a customized, filtered view of the content tree 220, and allows the user to avoid the inconvenience of viewing content items that are in different languages and/or directed to different geographic regions than the user is interested in. Thus, for example, a user can specify that he or she is interested only in nodes that include the Locale of "English, U.K.," to obtain a directory of content objects that are in the English language which are directed to the United Kingdom. Second, as indicated above, locales-based filtering conserves bandwidth by reducing unnecessary data transfers over the WAN 106. This, in-turn, increases performance from the viewpoint of the user.

Although nodes are filtered in the preferred embodiment based on user-specified language and geographic region filters, it will be readily apparent that other types of filters can be employed. For example, in other embodiments users may be able to specify a "media type" filter in order to select nodes of a particular media type (such as text, still picture, video, sound, multimedia or animation). A generic "media type" property may then be defined to allow sysops to specify the media type or types of the nodes they create.

FIG. 11 illustrates the sequence of steps that are performed by a Directory Service Provider (on a particular Directory Service application server 120) to determine whether a particular node should be shown to a particular user. This determination is made for each node that is the subject of a GetProperties, GetChildren, GetParents or GetDeidFromGoWord call. Thus, for example, if a GetChildren(Node5) call is received by the Directory Service, and node 5 has ten children, the sequence of steps of FIG. 11 will be performed 10 times—once for each child node.

With reference to block 1102, the Directory Service Provider initially reads the node's 32-bit security token, which is stored as the Security Token property of the node. As described above, the security token identifies a single content category to which the node has been assigned (typically by system administrators) for security purposes. In the preferred embodiment of the network 100, various predefined content categories exist such as "internal public content," "Internet public content," "18-and-older content," "corporation X beta test data," etc., and different users are assigned different access rights (via the access rights database 152) with respect to different content categories. Every node of the content tree 220 has a security token, and is assigned to exactly one content category.

With reference to block 1104, the Directory Service Provider generates a GetAccountRights call to determine whether or not the user has access rights with respect to the content category of the node. The parameters of the GetAccountRights API are the user's 32-bit user ID and the 32-bit security token. The GetAccountRights API includes code which generates user-specific queries of the access rights database 152, and includes code which implements an access rights cache (not shown) within each application server 120 that generates GetAccountRights calls. A preferred implementation of the access rights database 152 and the access rights cache are described in a concurrently filed, commonly assigned U.S. application having the title SYSTEM AND METHOD FOR CONTROLLING ACCESS TO DATA ENTITIES IN A COMPUTER NETWORK, which is incorporated herein by reference.

The GetAccountRights API returns either (1) a code which indicates that the user is not authorized to access the content category (and that the user is thus not authorized to access the node), or (2) a 16-bit access rights value which specifies the access rights (in the form of privilege levels) of the user with respect to the content category. With reference to blocks 1106 and 1108, if the GetAccountRights API returns a code indicating that the user is not authorized to access the node (or equivalently, that the user has no access rights with respect to the node), no properties of the node are returned to the client, and the icon and properties of the node are not made visible to the user. (From the viewpoint of the user and the client application, the unaccessible node does not exist.)

With reference to blocks 1112 and 1114, if an access rights value is returned by the GetAccountRights API, indicating that the user has at least some access rights with respect to the node (and specifically, at least viewer-level access rights), the Directory Service Provider checks the Locales parameter of the TreeNav call to see if a locales filter has been provided by the client. If no locales filter was provided, indicating that no locales filtering should be performed, the Directory Service Provider returns the property or properties requested by the client. (As indicated above, if a requested property does not exist, the Directory Service Provider returns an empty property to the client.) As indicated by blocks 1114 and 1118, if a locales filter has been provided but the node does not have a locales property, the Directory Service Provider similarly returns the requested property or properties.

With reference to block 1120, if a locales filter has been provided and the node has a locales property, the list of LCIDs in the filter is compared against the LCIDs of the node. With reference to block 1122, if at least one of the LCIDs in the filter appears in the node's LCID list, the Directory Service Provider returns the requested property or properties of the node to the client. Otherwise, the Directory Service Provider does not return any of the node's properties.

As will be readily apparent to those skilled in the art, a number of benefits are achieved by returning node properties only when the user is authorized to access the node. For example, the user sees only those service areas (nodes) to which he or she has access, and is not inconvenienced with having to see icons that cannot be opened. Further, a high level of security is provided against hackers, since users cannot see or otherwise obtain information about nodes to which they have no access rights. Further, as indicated above, WAN bandwidth is conserved, since properties are not unnecessarily passed to the client.

11. Other Embodiments

Although the various aspects and features of the present invention have been described in terms of a preferred implementation of an on-line services network 100, this network implementation has been presented by way of example only, and is not intended to limit the scope of the invention. Accordingly, the scope of the present invention is intended to be defined only by reference to the following claims and their equivalents.

What is claimed is:

1. A distributed directory service for providing users of a computer network with a hierarchical directory of services on said network, comprising:

a plurality of groups of application servers providing a plurality of different services, each one of the plurality of services storing a respective plurality of content nodes within a respective hierarchical directory structure for the service; and a plurality of junction nodes stored on the plurality of groups of application servers, the junction nodes linking the hierarchical directory structure with content nodes of different hierarchical directory structures to form an integrated hierarchical directory structure wherein the content node of the different hierarchical directory structure is not a child node of the junction node.

2. A directory service according to claim 1, wherein said integrated hierarchical directory structure is a directed acyclic graph.

3. A directory service according to claim 1, wherein each of said junction nodes serves as a proxy within one hierarchical directory structure for a corresponding content node of a different hierarchical directory structure.

4. A directory service according to claim 1, wherein each of said junction nodes provides user-transparent link between two of said hierarchical directory structures.

5. A directory service according to claim 1, further comprising an application program interface (API) for allowing client applications to navigate and access said content nodes stored by said plurality of different services using a common set of API methods, said API implemented at least in-part by each of said plurality of different service applications.

6. A directory service according to claim 1, wherein said content nodes stored by said plurality of different services represent online services and associated data entities of an online services network.

7. A directory service according to claim 1, further comprising a client application configured to allow a user to interactively navigate said integrated hierarchical directory structure via a graphical user interface.

8. A directory service according to claim 7, wherein said client application comprises a plurality of navigation modules corresponding, respectively, to said plurality of different services.

9. A distributed directory service according to claim 1, further comprising a client application that runs on a computer of a user and communicates over the network with the plurality of different service applications using a common application program interface, the client application configured to request node properties from the plurality of different service applications in response to actions of the user, and to use node properties returned by the plurality of different service applications to generate and display a graphical representation of the integrated hierarchical directory structure.

10. A node of a hierarchical directory structure, said node stored on an application server of an online services network, said node representing a service which may be accessed by users of said network via client applications running on client computers, said node comprising: a first property stored within a memory of said application server, said first property comprising a textual description of said service; and a second property stored within said memory of said application server, said second property identifying a service application corresponding to said service, said service application providing user access to said service.

11. A node according to claim 10, further comprising a remote properties cache on said application server, said remote properties cache temporarily storing at least one remote property of said node, said at least one remote property generated remotely by said service application.

12. A node according to claim 10, further comprising a third property stored within said memory of said application server, said third property specifying a security category of said node.

13. A node according to claim 10, further comprising a third property stored within said memory of said application server, said third property specifying at least one language of said node.

14. A node according to claim 10, further comprising a third property stored within said memory of said application server, said third property specifying at least one geographic region to which said node applies.

15. A node according to claim 10, further comprising a third property stored within said memory of said application server, said third property specifying a downloadable icon bitmap which corresponds to said node.

16. A node according to claim 10, further comprising a third property stored within said memory of said application server, said third property specifying a downloadable sound file which corresponds to said node, said sound file specifying sounds generated on said client computers in association with said node.

17. A node according to claim 10, further comprising a third property stored within said memory of said application server, said third property specifying a download-and-run file which corresponds to said node.

18. A node according to claim 10, further comprising a third property stored within said memory of said application server, said third property specifying a downloadable banner object which corresponds to said node.

19. A node according to claim 10, further comprising a third property stored within said memory of said application server, said third property specifying at least one parent node of said node.

20. A node according to claim 10, further comprising a third property stored within said memory of said application server, said third property specifying a content rating of said service.

21. A node according to claim 10, further comprising a third property stored within said memory of said application server, said third property specifying a price associated with accessing said service.

22. A distributed directory service for providing users of a computer network with a hierarchical directory of services on said network, comprising:

a plurality of groups of application servers providing a plurality of different services, each one of the plurality of services storing a respective plurality of content nodes within a respective hierarchical directory structure for the service;

a plurality of junction nodes stored on the plurality of groups of application servers, the junction nodes linking content nodes of different hierarchical directory structures to form an integrated hierarchical directory structure, each of the junction nodes serves as a proxy within one hierarchical directory structure for a corresponding content node of a different hierarchical directory structure, each of the junction nodes provides user transparent link between two of said hierarchical directory structures, and wherein the content node of the different hierarchical directory structure is not a child node of the junction nodes; and a client application configured to allow a user to interactively navigate said integrated hierarchical directory structure via a graphical user interface.

* * * * *

UNITED STATES PATENT AND TRADEMARK OFFICE
CERTIFICATE OF CORRECTION

PATENT NO. : 7,502,832 B2  
APPLICATION NO. : 10/911055  
DATED : March 10, 2009  
INVENTOR(S) : Ramon J. San Andres et al.

It is certified that error appears in the above-identified patent and that said Letters Patent is hereby corrected as shown below:

In column 34, line 32, in Claim 6, delete "online" and insert -- on-line --, therefor.

In column 34, line 33, in Claim 6, delete "online" and insert -- on-line --, therefor.

In column 34, line 53, in Claim 10, delete "online" and insert -- on-line --, therefor.

In column 36, line 24-25, in Claim 22, delete "user transparent" and insert -- user-transparent --, therefor.

Signed and Sealed this
Tenth Day of May, 2011

David J. Kappos
*Director of the United States Patent and Trademark Office*